United States Patent
Sha et al.

(10) Patent No.: US 10,452,562 B2
(45) Date of Patent: Oct. 22, 2019

(54) FILE ACCESS METHOD AND RELATED DEVICE

(71) Applicant: HUAWEI TECHNOLOGIES CO.,LTD., Shenzhen, Guangdong (CN)

(72) Inventors: Hsing Mean Sha, Chongqing (CN); Qingfeng Zhuge, Chongqing (CN); Guanyu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 15/257,928

(22) Filed: Sep. 7, 2016

(65) Prior Publication Data

US 2016/0378680 A1    Dec. 29, 2016

Related U.S. Application Data

(63) Continuation of application No. PCT/CN2014/073070, filed on Mar. 7, 2014.

(51) Int. Cl.
| | |
|---|---|
| *G06F 12/00* | (2006.01) |
| *G06F 12/109* | (2016.01) |
| *G06F 16/11* | (2019.01) |
| *G06F 16/17* | (2019.01) |
| *G06F 12/1009* | (2016.01) |
| *G06F 3/06* | (2006.01) |

(52) U.S. Cl.
CPC .......... *G06F 12/109* (2013.01); *G06F 3/0643* (2013.01); *G06F 12/1009* (2013.01); *G06F 16/11* (2019.01); *G06F 16/1727* (2019.01); *G06F 2212/1008* (2013.01); *G06F 2212/1016* (2013.01); *G06F 2212/657* (2013.01)

(58) Field of Classification Search
CPC .... G06F 12/1009; G06F 12/109; G06F 16/11; G06F 16/1727; G06F 2212/1008; G06F 2212/1016; G06F 2212/657
USPC ......................................................... 711/163
See application file for complete search history.

(56) References Cited

U.S. PATENT DOCUMENTS

| | | | |
|---|---|---|---|
| 4,742,447 A | 5/1988 | Duvall et al. | |
| 2008/0127221 A1 | 5/2008 | Otte et al. | |
| 2009/0037685 A1 | 2/2009 | Hansen | |
| 2009/0113110 A1 | 4/2009 | Chen et al. | |

(Continued)

FOREIGN PATENT DOCUMENTS

| | | |
|---|---|---|
| CN | 86108127 A | 7/1987 |
| CN | 102184145 A | 9/2011 |

(Continued)

*Primary Examiner* — Mardochee Chery
(74) *Attorney, Agent, or Firm* — Leydig, Voit & Mayer, Ltd.

(57) ABSTRACT

Embodiments of the application provide a file access method. A computing node receives a file open request that carries a file identifier. The computing node obtains an index node of a file that is identified by the file identifier. The computing node further obtains, based on the index node, a physical address space of a memory area in a file storage area, in which the file is stored. The computing node allocates a virtual address space to the file, and recodes a virtual-physical address mapping relationship by using a memory page table. The virtual-physical address mapping relationship includes a mapping relationship between the virtual address space and the physical address space.

22 Claims, 11 Drawing Sheets

(56) References Cited

U.S. PATENT DOCUMENTS

| | | | |
|---|---|---|---|
| 2010/0064111 A1* | 3/2010 | Kunimatsu | G06F 12/08 711/161 |
| 2010/0287200 A1* | 11/2010 | Dhuse | H04N 7/17336 707/770 |
| 2011/0016122 A1* | 1/2011 | Motwani | H04L 67/1097 707/736 |
| 2012/0216003 A1 | 8/2012 | Nakai et al. | |
| 2013/0097354 A1 | 4/2013 | Arges et al. | |
| 2015/0058588 A1 | 2/2015 | Nakai et al. | |
| 2015/0134930 A1* | 5/2015 | Huang | G06F 12/1009 711/206 |

FOREIGN PATENT DOCUMENTS

| | | |
|---|---|---|
| CN | 102207896 A | 10/2011 |
| CN | 102693191 A | 9/2012 |
| EP | 0229691 A2 | 7/1987 |
| JP | 2012173870 A | 9/2012 |

\* cited by examiner

FILE ACCESS METHOD AND RELATED DEVICE

CROSS-REFERENCE TO RELATED APPLICATIONS

This application is a continuation of International Application No. PCT/CN2014/073070, filed on Mar. 7, 2014, which is hereby incorporated by reference in its entirety.

TECHNICAL FIELD

The present application relates to the field of computer technologies, and in particular, to a file access method and apparatus, and a computing node.

BACKGROUND

The concept of storage class memory (SCM) emerges recently, and this concept is based on next-generation non-volatile memory technology. Access effectiveness of the next-generation non-volatile memory is basically consistent with that of an ordinary memory module. Moreover, the next-generation non-volatile memory has the reliability of a semiconductor product, such as being shock-proof and compression-resistant. New data may be directly written to the next-generation non-volatile memory without erasing the existing data. Therefore, the next-generation non-volatile memory may be used as a next-generation storage device for alleviating a huge access speed difference between a processor and a storage. On one hand, like some conventional random access memories (RAM), an SCM may be directly hung on a memory bus, and directly face a central processing unit (CPU). On the other hand, functions of the SCM also extend to those of a conventional external storage, and may be used as a permanent data storage device.

It is predicted in the industry that, the next-generation non-volatile memories (NVMs) may become future storage devices to replace flash memories, magnetic disks or even dynamic random access memories (DRAMs). These storage devices have many excellent characteristics, such as fast access speed (close to that of a DRAM), addressable bytes (may be designed to have same access interface as that of a DRAM), and no lost data during a power failure (may persistently store data like flash memories or magnetic disks). By means of these characteristics, it is generally agreed that this type of innovative memory devices may become mainstream storage systems in a few years, and therefore results in revolutionary changes in the conventional storage system structure.

One of these revolutionary changes is that a file system may be residing in a memory, and it is intended to implement access to a file of the file system with data access performance approximate to that of an ordinary memory. Under this conceived architecture, use of a conventional file access manner becomes inappropriate.

SUMMARY

According to a first aspect of the application, a file access method is provided. The file access method is performed by a processor of a computing node. The computing node is controlled by an operating system and one or more processes are running in the computing node. By implementing the method, after receiving a file open request that carries a file identifier, the computing node obtains an index node of a file identified by the file identifier. Based on the index node, the computing node further obtains a physical address space, where the file is stored in the physical address space in a file storage area of a memory of the computing node. And then, the computing node allocates a virtual address space to the file, and records a virtual-physical address mapping relationship in a memory page table that is stored in a work process area of the memory, wherein the virtual-physical address mapping relationship is a mapping relationship between the virtual address space and the physical address space.

With reference to the first aspect, in a first possible implementation manner of the first aspect, the computing node obtains the physical address space in the file storage area of the memory based on a file page table. The file page table or a pointer pointing to the file page table is recorded in the index node.

With reference to the first possible implementation manner of the first aspect, in a second possible implementation manner of the first aspect, the computing node adds an entry in the memory page table for recording the virtual-physical address mapping relationship. The virtual-physical address mapping relationship includes the virtual address space and the file page table or the pointer pointing to the file page table.

With reference to the second possible implementation manner of the first aspect, in a third possible implementation manner of the first aspect, a total quantity of levels of the memory page table is Y, a total quantity of levels of the file page table is X, X is a positive integer, and Y is a positive integer greater than X. If the entry includes the file page table, the entry is an entry in a $(Y-X+1)^{th}$ level of the memory page table. Alternatively, if the entry includes the pointer pointing to the file page table, the entry is an entry in a $(Y-X)^{th}$ level of the memory page table.

With reference to the first aspect, in a fourth possible implementation manner of the first aspect, the computing node further records the virtual address space or a start address of the virtual address space in the index node.

With reference to the first aspect, in a fifth possible implementation manner of the first aspect, the computing node further records the virtual address space or a start address of the virtual address space in a file object corresponding to the file.

With reference to the first aspect, in a sixth possible implementation manner of the first aspect, the virtual address space is a kernel virtual address space or a user process virtual address space.

With reference to the first aspect, in a seventh possible implementation manner of the first aspect, after receiving a file read request for reading a file content of the file, the computing node obtains, according to the data volume of the file content, the virtual address space of the file and the virtual-physical address mapping relationship recorded in the memory page table, a read physical address space of the file content in the file storage area; reads, according to the read physical address space, the file content from the file storage area; and writes the file content to the memory area. The file read request carries a read-in memory address space and a data volume of the file content. The read-in memory address space is an address space of a memory area in the work process area of the memory.

With reference to the first aspect, in eighth possible implementation manner of the first aspect, after receiving a file write request for writing a file content to the file, where the file write request carries a read-out memory address space and a data volume of the file content and the read-out memory address space is an address space of a memory area in the work process area of the memory, the computing node obtains, according to the data volume of the file content, the virtual address space of the file and the virtual-physical address mapping relationship recorded in the memory page table, a write physical address space of the file content in the file storage area, wherein the write physical address space is a physical address space of a memory area in the file storage area of the memory; and writes the file content stored in the memory area in the work process area of the memory to the memory area in the file storage area of the memory.

With reference to the first aspect, in a ninth possible implementation manner of the first aspect, a storage capacity of the memory area in the file storage area of the memory is greater than or equal to the data volume of the file content.

With reference to the first aspect, in a tenth possible implementation manner of the first aspect, after receiving a file close request for closing the file, the computing node releases the virtual address space allocated to the file, and releases the virtual-physical address mapping relationship recorded in the memory page table.

With reference to the first aspect, in an eleven possible implementation manner of the first aspect, the computing node further creates the file in the file storage area when it is determined that the file identified by the file identifier is not stored in the file storage area and creates the index node of the file.

According to a second aspect of the application, a computing node includes a processor and a storage device. The storage device stores program code for executing by the processor, the program code instruct the processor to implement the file access method of the first aspect or any one of the first to eleven possible implementation manner of the first aspect.

According to a third aspect of the application, a non-transitory computer storage medium stores a program code. When being executed, the program code instruct a processor of a computing node to execute a file access method of the first aspect or any one of the first to eleven possible implementation manner of the first aspect.

BRIEF DESCRIPTION OF DRAWINGS

The following briefly introduces the accompanying drawings used in describing the embodiments of the present application.

DETAILED DESCRIPTION

Figure 1:
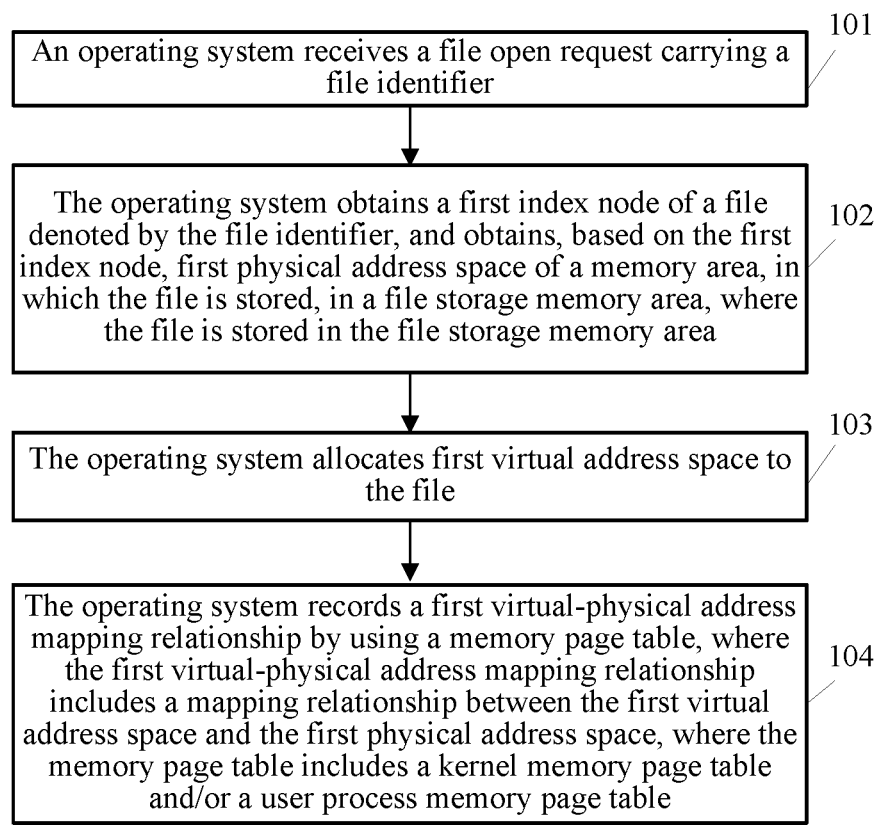
FIG. 1 is a flowchart of a file access method.

Embodiments of the present application provide a file access method and a related device, particularly applicable to accessing files when a file system is residing in a memory.

In the specification, claims, and accompanying drawings of the present application, the terms "first", "second", "third", "fourth", and so on are intended to distinguish between different objects, and are not intended to indicate a particular order.

The file access method is performed by a computing node. The computing node includes a processor and a memory. The memory includes a file storage area and a work process area. A kernel memory page table is stored in the work process area. An operating system (i.e. software controlling the operation of the computing node) is also stored in the work process area for execution by the processor. In a particularly implementation manner, the work process area may include a kernel process area and a user process area. The kernel memory page table may be stored in the kernel process area, and a user process memory page table may be stored in the user process area. The operating system may be stored in the kernel process area.

The work process area of the memory is a physical memory area for storing contents such as data structures and variables that are used in various processes. The data structures and the variables may include data such as heaps, stacks, memory mapping areas of a running process, or variables, characters and arrays involved in a running process. In particular, contents related to a running user process may be stored in a user process area of the work process area, and contents related to a running kernel process may be stored in a kernel process area of the work process area.

The file storage area of the memory may be a physical memory area used for storing a file system, and various information of the file system may be stored in the file storage area. For example, the file storage area may store index nodes of the file system and files, and information such as superblocks (if exist) of the file system may also be stored in the file storage area.

A storage medium of the file storage area may include a non-volatile storage medium and/or a volatile storage medium. A storage medium of the work process area may include a non-volatile storage medium and/or a volatile storage medium. The work process area and the file storage area do not overlap with each other.

A file is stored in a physical address space of the file storage area. An index node of the file may include information of the physical address space where the file is stored. For example, a first file page table (FPT), or a pointer pointing to the first file page table, may be recorded in a first index node of the file. The first file page table is used for pointing to a memory section in the file storage area in which the file is stored. The first file page table is a single-level or multilevel file page table, in which a first physical address space is a physical address space of the file storage area in which the file is stored. Alternatively, the first physical address space or a start address of the first physical address space may be also directly stored in the first index node. Further, the first index node of the file may include information such as metadata of the file.

As shown in FIG. 1, the file access method includes the following steps:

101: The computing node, running the operating system, receives a file open request that carries a file identifier identifying a to-be-opened file. The file open request may come from a user process.

The file open request may carry a storage path of the file to be opened, and the file identifier may be included in the file storage path. Alternatively, the file open request may carry the file identifier and may not carry any file storage path. The file open request may further carry a file type flag bit, where the file type flag bit indicates a file type of the file identified by the file identifier. The type of the file may be a directory file or data file.

102: Running the operating system, the computing node obtains a first index node of the file identified by the file identifier, and obtains, based on the first index node, a first physical address space in the file storage area of the memory, in which the file is stored.

Obtaining the first index node of the file may be that: after the computing node determines that the file is stored in the file storage area, the computing node obtains the first index node of the file. Alternatively, it may be considered by default that the file is stored in the file storage area, and determining whether the file is stored in the file storage area may be skipped.

103: The computing node, running the operating system, allocates a first virtual address space to the file.

The first virtual address space may be of a preset size. For example, the size of the first virtual address space may be less than or equal to a maximum virtual address space of the file system divided by a maximum quantity of files whose simultaneous opening is supported by the file system. Alternatively, the size of the first virtual address space may correspond to a file type of the file. For example, a size of a virtual address space that corresponds to a directory file may not be the same as a size of a virtual address space that corresponds to a data file. For example, the size of the virtual address space corresponding to the directory file may be less than the size of the virtual address space corresponding to the data file. For example, the size of the virtual address space corresponding to the directory file may be 1 MB, 2 MB, 10 MB, 30 MB, etc., whereas the size of the virtual address space corresponding to the data file may be 100 MB, 500 MB, 1 GB, 10 GB, 100 GB, 2 TB, etc.

104: The computing node, running the operating system, records a first virtual-physical address mapping relationship in a memory page table. The first virtual-physical address mapping relationship is a mapping relationship between the first physical address space and the first virtual address space. The memory page table includes a kernel memory page table and/or a user process memory page table.

Because the first virtual-physical address mapping relationship is recorded in the kernel memory page table and/or the user process memory page table, it may be considered that, to some extent, the first physical address space of the memory area in the file storage area, in which the file is stored, is taken as a physical address space corresponding to a memory area in a work process area. This helps a kernel or a user process to access the file in the file storage area in a manner similar to that of accessing the work process area. In this way, the kernel or the user process accesses a file of a file system, residing in the kernel, with data access performance approximate to that of accessing an ordinary memory. This helps greatly improve file access performance. It can be seen that the file access solution is suitable for high-performance file access in a scenario in which a file system is residing in a memory. Moreover, because virtual address space is allocated to a file only when the file is requested to be opened, it helps to reduce possibilities of ineffective occupancy of virtual address spaces of a system and address conflict possibilities, and helps improve utilization efficiency of the virtual address spaces of the system.

If a file open request carrying a file identifier of a file is received from a user process, a file object corresponding to the file and the user process may be created. After a first virtual-physical address mapping relationship is recorded in a memory page table, a file descriptor or the like of the file may be fed back to the user process.

Recording the first virtual-physical address mapping relationship in the memory page table may include: adding to the memory page table an entry (may be one or more entries) that records the first virtual-physical address mapping relationship. The entry includes the first file page table or a pointer pointing to the first file page table. For example, a total quantity of levels of the memory page table is Y, a total quantity of levels of the first file page table is X. If the entry includes the first file page table, the entry may be an entry in a $(Y-X+1)^{th}$ level of memory page table in the memory page table. If the entry includes the pointer used for pointing to the first file page table, the entry may be an entry in a $(Y-X)^{th}$ level of memory page table in the memory page table. X is a positive integer, and Y is a positive integer greater than X. In some special application scenarios, the entry (may be one or more entries) used for recording the first virtual-physical address mapping relationship and added to the memory page table may also be an entry in any level of memory page table in the memory page table.

Alternatively, recording the first virtual-physical address mapping relationship in the memory page table may include: adding to the memory page table, an entry (may be one or more entries) that records the first virtual-physical address mapping relationship. The entry includes the first physical address space, or the entry may include a start address and/or an end address of the first physical address space. For example, the entry may be an entry in a lowest level of memory page table or may be an entry in any level of memory page table.

At least one of the first virtual address space, the start address of the first virtual address space and the end address of the first virtual address space may be further recorded in the first index node. At least one of the first virtual address space, the start address of the first virtual address space and the end address of the first virtual address space may be further recorded in a file object corresponding to the file.

The first virtual address space may be continuous or discontinuous virtual address space. The first virtual address space may be located in the kernel virtual address space, or the first virtual address space may be located in the user process virtual address space.

After the file is opened, an operation such as read/write may be performed on the file.

The computing node running the operating system may further receive a file read request for reading a file content of the file. The file read request carries a read-in memory address space and a data volume of a first file content of the file. Moreover, the file read request may further carry a file descriptor of the file. The read-in memory address space is an address space of a first memory area in a user process area. The computing node obtains, based on the data volume of the first file content, the first virtual address space and the first virtual-physical address mapping relationship that is recorded in the memory page table, read physical address space in which the first file content is read from the file storage area. The computing node reads, based on the read physical address space, the first file content of the file from the file storage area; and writes the first file content to the first memory area (writing, based on the read-in memory address space, the first file content to the first memory area).

The obtaining, based on the data volume of the first file content, the first virtual address space and the first virtual-physical address mapping relationship that is recorded in the memory page table, read physical address space in which the first file content is read from the file storage area may include: obtaining, based on the data volume of the first file content, a first file content offset, the first virtual address space and the first virtual-physical address mapping relationship that is recorded in the memory page table, the read physical address space in which the first file content is read from the file storage area, where the first file content offset is obtained from the file read request, or the first file content offset is obtained from the file object corresponding to the file.

For example, a start read virtual address for reading the first file content may be obtained based on the first file content offset (where if the first file content offset is not obtained from the file read request or from the file object corresponding to the file, a default file content offset may be considered as the first file content offset) and the start address of the first virtual address space. A start read physical address for reading the first file content from the file storage area is obtained by using the start read virtual address and the first virtual-physical address mapping relationship; and read physical address space for reading the first file content from the file storage area is obtained based on the start read physical address and the data volume of the first file content.

For another example, a start read virtual address for reading the first file content may be obtained based on the first file content offset (where if the first file content offset is not obtained from the file read request or from the file object corresponding to the file, a default file content offset may be considered as the first file content offset) and the start address of the first virtual address space. Read virtual address space for reading the first file content is obtained based on the start read virtual address and the data volume of the first file content; and read physical address space for reading the first file content from the file storage area is obtained by using the read virtual address space and the first virtual-physical address mapping relationship.

The file access method may further include: receiving a file write request for requesting to write file content to the file, where the file write request carries read-out memory address space and a data volume of second file content that is requested to be written to the file (moreover, the file write request may further carry the file descriptor of the file), where the read-out memory address space is address space of a second memory area in the process work memory area; obtaining, based on the data volume of the second file content, the first virtual address space and the first virtual-physical address mapping relationship that is recorded in the memory page table, write physical address space in which the second file content is written to the file storage memory area, where the write physical address space is physical address space of a third memory area in the file storage memory area; and writing the second file content temporarily stored in the second memory area to the third memory area.

The obtaining, based on the data volume of the second file content, the first virtual address space and the first virtual-physical address mapping relationship that is recorded in the memory page table, write physical address space in which the second file content is written to the file storage area may include: obtaining, based on the data volume of the second file content, a second file content offset, the first virtual address space and the first virtual-physical address mapping relationship that is recorded in the memory page table, the write physical address space in which the second file content is written to the file storage area, where the second file content offset is obtained from the file write request, or the second file content offset is obtained from the file object corresponding to the file.

A start write virtual address for writing the second file content to the file may be obtained based on the second file content offset (where if the second file content offset is not obtained from the file write request or from the file object corresponding to the file, a default file content offset may be considered as the second file content offset) and the start address of the first virtual address space. A start write physical address for writing the second file content to the file of the file storage area may be obtained by using the start write virtual address and the first virtual-physical address mapping relationship. The write physical address space for writing the second file content to the file of the file storage area may be obtained based on the start write physical address and the data volume of the second file content.

A start write virtual address for writing the second file content to the file may be obtained based on the second file content offset (where if the second file content offset is not obtained from the file write request or from the file object corresponding to the file, a default file content offset may be taken as the second file content offset) and the start address of the first virtual address space. Write virtual address space for writing the second file content to the file of the file storage area may be obtained based on the start write virtual address and the data volume of the second file content. The write physical address space for writing the second file content to the file of the file storage area may be obtained by using the write virtual address space and the first virtual-physical address mapping relationship.

A storage capacity of the third memory area may be greater than or equal to the data volume of the second file content. The third memory area and a memory area corresponding to the first physical address space have an intersection set or have no intersection set. It can be understood that, generally, if the third memory area and the memory area corresponding to the first physical address space have an intersection set, it may indicate that the second file content replaces some or all original file content in the file (if the intersection set between the third memory area and the memory area corresponding to the first physical address space is less than the third memory area, it indicates that a new memory area is allocated to the second file content, that is, the memory area for storing the file changes, and the memory area for storing the file is expanded). If the third memory area and the memory area corresponding to the first physical address space have no intersection set, it may indicate that the second file content is newly added to the file, and the third memory area is a new memory area allocated to the second file content, that is, the memory area for storing the file changes, and the memory area for storing the file is expanded.

Further, if the memory area, in which the file is stored, in the file storage area changes, the first file page table may be updated, so that an updated first file page table points to a memory area, for currently storing the file, in the file storage area.

Certainly, further, the first virtual-physical address mapping relationship recorded in the memory page table may be updated to a third virtual-physical address mapping relationship, where the third virtual-physical address mapping relationship includes a mapping relationship between the first virtual address space and a third physical address space, and the third physical address space is physical address space of the memory area, for currently storing the file, in the file storage area. If a pointer pointing to the first file page table (such as a start physical address, of the first file page table, recorded in the memory page table) is recorded in the memory page table, if a start physical address of the updated first file page table does not change, the pointer pointing to the first file page table and recorded in the memory page table may be not modified. Moreover, in this case, a virtual-physical address mapping relationship may be re-established by updating the first file page table and without the need of modifying the memory page table, which greatly simplifies a mapping operation.

The file access method may further include: receiving, by the operating system, a file close request used for requesting to close the file; releasing the first virtual address space allocated to the file; and releasing the first virtual-physical address mapping relationship recorded in the memory page table. Further, if the file object corresponding to the file is created, the file object corresponding to the file may be further released.

After a file open request carrying a file identifier is received, when it is determined that a file identified by the file identifier is not stored in a file storage area, the file is created in the file storage area, and a second index node is allocated to the file. A second file page table or a pointer pointing to a second file page table (the pointer pointing to the second file page table may be a start physical address of the second file page table) may be recorded in the second index node, where the second file page table is used for pointing to a memory area, in which the file is stored, in the file storage area; second virtual address space is allocated to the file; and a second virtual-physical address mapping relationship is recorded by using a memory page table, where the second virtual-physical address mapping relationship may include a mapping relationship between the second virtual address space and a second physical address space, where the second physical address space is physical address space of the memory area, in which the file is stored, in the file storage area, where the memory page table includes a kernel memory page table and/or a user process memory page table. Optionally, there is a correspondence between a quantity of levels of the second file page table and a file type of the file, where the file type of the file may be determined by using, for example, a file type flag bit, of the file, carried in the file open request, and certainly the file type of the file may be also determined in another manner.

After a file open request carrying a file identifier is received, when it is determined that a file identified by the file identifier is not stored in a file storage area, the file is created in the file storage area, and a third index node is allocated to the file. In this case, no file page table of the file or an empty file page table of the file may be created (where if an empty file page table of the file is created, the third index node may include the empty file page table or a pointer used for pointing to the empty file page table), and when file content needs to be written to the created file, a memory area for storing the file may be expanded (for example, expanded from 10 MB to 1000 MB), and the file page table of the file is updated, so that an updated file page table points to an expanded memory area for storing the file.

A data structure of a file page table may be similar to or same as that of a memory page table.

The foregoing operations may be executed under an operating system (specifically may be executed under a kernel file system in the operating system) or the like.

It can be seen that the above file access solution is particularly suitable for high-performance file access in a file system which is residing in a memory. Moreover, because virtual address space is allocated to a file only when the file is requested to be opened, it helps reduce a possibility of ineffective occupancy of virtual address space of a system and an address conflict possibility, and helps improve utilization efficiency of the virtual address space of the system.

Further, continuous virtual address space may be allocated to the file in a file open process. Therefore it helps to access, starting from a start virtual address for reading/writing the file, a memory page within a needed read/write length for one time, and it does not need to search for corresponding virtual addresses of different memory pages for multiple times at a software layer. In this way, a sequential access speed of the file may be very fast.

By means of a memory management unit (MMU), conversion between a virtual address and a physical address of a file may be transparently completed, which helps increase a file access speed, or even achieve zero overheads.

Further, if a file page table, whose data structure is similar to or same as that of a memory page table, is used to point to a memory page, for storing file content, in the file storage area, because the data structure of the file page table is similar to or same as that of the memory page table, it helps implement zero conversion between data structures of page tables, and may not need to perform an operation of re-establishing a mapping relationship between a physical address space and a virtual address space of a file on the file page table when the memory page for storing the file content changes. By updating the file page table, a pointer pointing to an updated file page table is inserted into an entry of the file page table, thereby completing re-establishment of a mapping between a physical address and a virtual address of the file. This helps re-establish the mapping between the physical address and the virtual address of the file within a constant time unrelated to a size of the file.

Further, independent virtual address spaces may be allocated to different files. Therefore a file, in the file storage area, of the file system is protected by a system virtual address and the MMU. This greatly reduces a possibility that the file is miswritten, not only can well protect the file, but also does not need any additional write protection mechanism, so as to help simplify the system.

Further, a file is accessed by using a virtual address, a size of the file is affected only by a size of system virtual address space, and a quantity of files whose simultaneous opening is supported by the operating system. Neither the size nor the quantity is a limitation on the file system, and therefore the size of the file may not be limited by design of the file system.

Further, a manner similar to that of memory management is used in the file system, and in both manners, a storage medium is accessed by using a virtual address, and conversion between a virtual address and a physical address may be performed by using the MMU. Changes in the kernel may be relatively less, which also helps migrate the file system to the existing operating system.

For better understanding and implementing the solution of this embodiment of the present application, some specific application scenarios are described below by way of examples.

Figure 2:
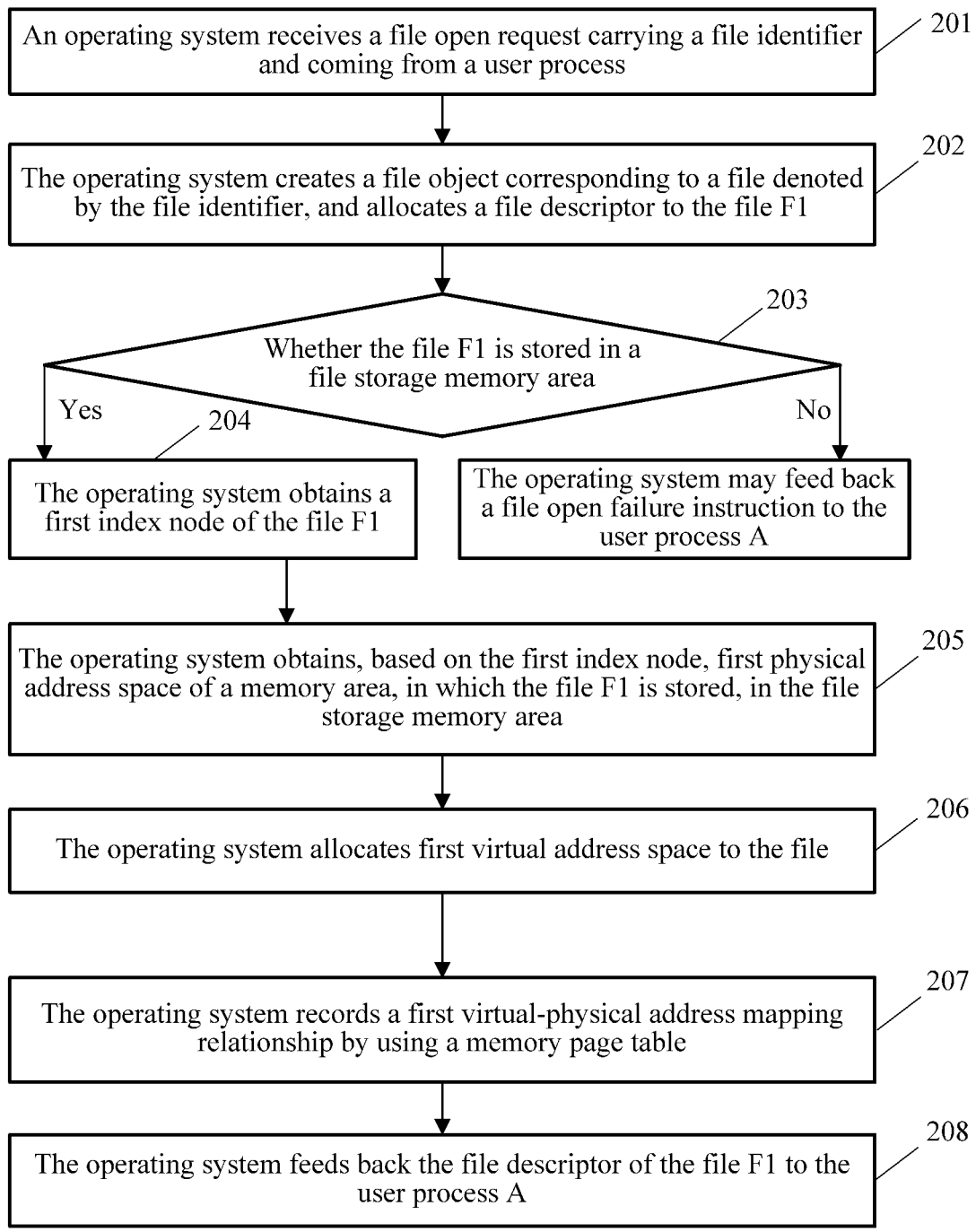
FIG. 2 is a flowchart of an application scenario of the file access method.

As shown in FIG. 2, one application scenario of the file access method may include the following steps:

201: An operating system, which is ran by a computing node, receives a file open request carrying a file identifier from a user process (referred to as a user process A below).

The file open request may carry a file storage path of a file requested to be opened, and the file identifier may be included in the file storage path. Alternatively, the file open request may only carry the file identifier and not the file storage path. Further, the file open request may further carry a file type flag bit, where the file type flag bit indicates a file type of the file (e.g. the file type may be a directory file or data file).

202: The operating system creates a file object corresponding to a file identified by the file identifier (the file is referred to as a file F1 below), and allocates a file descriptor to the file F1, where the file object of the file F1 may be found based on the file descriptor of the file F1.

203: The operating system determines whether the file F1 is stored in a file storage area of a memory of the computing node.

If the file F1 is stored in a file storage area, perform step 204.

If the file F1 is not stored in a file storage area, the operating system may feed back a file open failure instruction to the user process A.

204: The operating system obtains a first index node of the file F1, where the file is stored in the file storage area, and the first index node of the file F1 is also stored in the file storage area.

205: The operating system obtains, based on the first index node, first physical address space of a memory area in the file storage area, in which the file F1 is stored.

The first index node includes the pointer pointing to the first file page table of the file F1, and therefore the pointer pointing to the first file page table of the file F1 may be obtained based on the first index node. Because the pointer pointing to the first file page table of the file F1 is obtained, the first file page table of the file F1 may be obtained, and then the first physical address space of the memory area in the file storage area, in which the file F1 is stored, may be obtained based on the first file page table of the file F1.

206: The operating system allocates first virtual address space to the file.

First virtual address space of a preset size may be allocated to the file (for example, the size of the first virtual address space may be less than or equal to maximum virtual address space of the system divided by a maximum quantity of files whose simultaneous opening is supported by the system). Alternatively, first virtual address space of a size corresponding to a file type of the file may be allocated to the file according to the file type.

207: The operating system records a first virtual-physical address mapping relationship by using a memory page table.

The first virtual-physical address mapping relationship is a mapping relationship between the first virtual address space and the first physical address space, where the memory page table includes a kernel memory page table and/or a user process memory page table.

At least one of the first virtual address space, a start address of the first virtual address space and an end address of the first virtual address space may be further recorded in the first index node, and/or at least one of the first virtual address space, the start address of the first virtual address space and the end address of the first virtual address space may be further recorded in a file object corresponding to the file.

The first virtual address space is continuous or discontinuous virtual address space. The first virtual address space is located in a kernel virtual address space or the first virtual address space is located in a user process virtual address space.

208: The operating system feeds back the file descriptor of the file F1 to the user process A. The user process A may initiate a read/write operation on the file F1 based on the file descriptor of the file F1.

Figure 3:
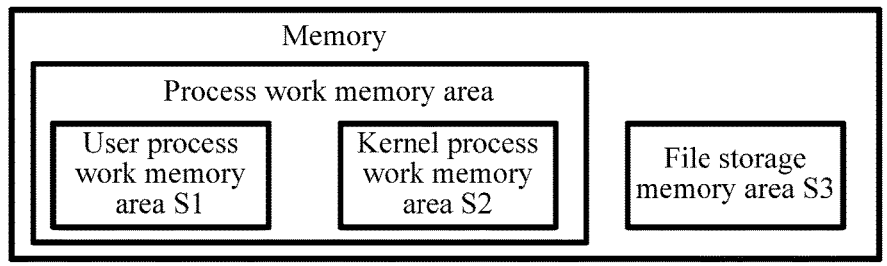
FIG. 3 is a schematic diagram of a memory of a computing node.

FIG. 3 shows an exemplary configuration of a memory of a computing node. The memory of the computing node includes a user process area S1, a kernel process area S2 and a file storage area S3.

The user process area S1 may refer to a physical memory area used for storing contents such as data structures and variables that are used in various user processes. The data structures and the variables that are stored in the user process area may include data such as heaps, stacks, memory mapping areas of a running user process, or variables, characters and arrays involved in a running user process. The kernel process area S2 may refer to a physical memory area used for storing content such as data structures and variables that are used in various kernel processes. The data structures and the variables that are stored in the kernel process area may include data such as heaps, stacks, memory mapping areas of a running kernel process, or variables, characters and arrays involved in a running kernel process.

Figure 4:
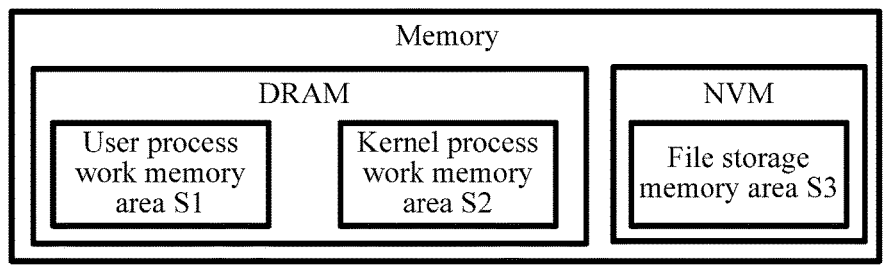
FIG. 4 is another schematic diagram of a memory of a computing node.

The file storage area S3 may include a non-volatile memory area and/or a volatile memory area (that is, a storage medium of the file storage area S3 includes a non-volatile storage medium and/or a volatile storage medium). The work process area (such as the kernel process area S2 or the user process area S1) may include a non-volatile memory area and/or a volatile memory area (that is, a storage medium of the work process area includes a non-volatile storage medium and/or a volatile storage medium). The work process area (such as the kernel process area S2 or the user process area S1) and the file storage area S3 do not overlap with each other. As shown in FIG. 4, the user process area S1 and the kernel process area S2 may be located in a DRAM, and the file storage area S3 may be located in an NVM.

Figure 5:
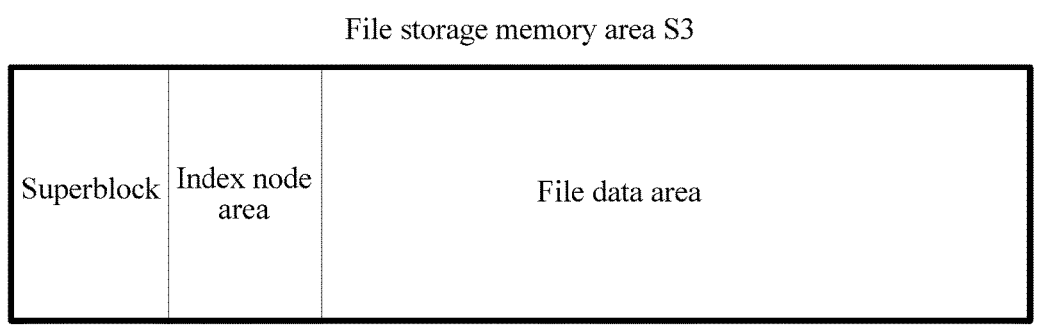
FIG. 5 is a schematic diagram of a file storage area.

The file storage area S3 may refer to a physical memory area used for storing a file system, and various information of the file system may be stored in the file storage area S3. For example, an index node and a file of the file system may be stored in the file storage area S3, and information such as a superblock (if exists) of the file system may be further stored in the file storage area S3. For example, as shown in FIG. 5, the file storage area S3 may include a superblock, an index node area used for storing a file index node and a file data area used for storing a file.

A pointer pointing to a first file page table may be recorded in the first index node of the file F1. The pointer may include a start physical address of the first file page table. The first file page table is used for pointing to a memory area, in which the file F1 is stored, in the file storage area S3, and the first physical address space is physical address space of the memory area, in which the file is stored, in the file storage area. The first file page table is a single-level or multilevel file page table.

Figure 6:
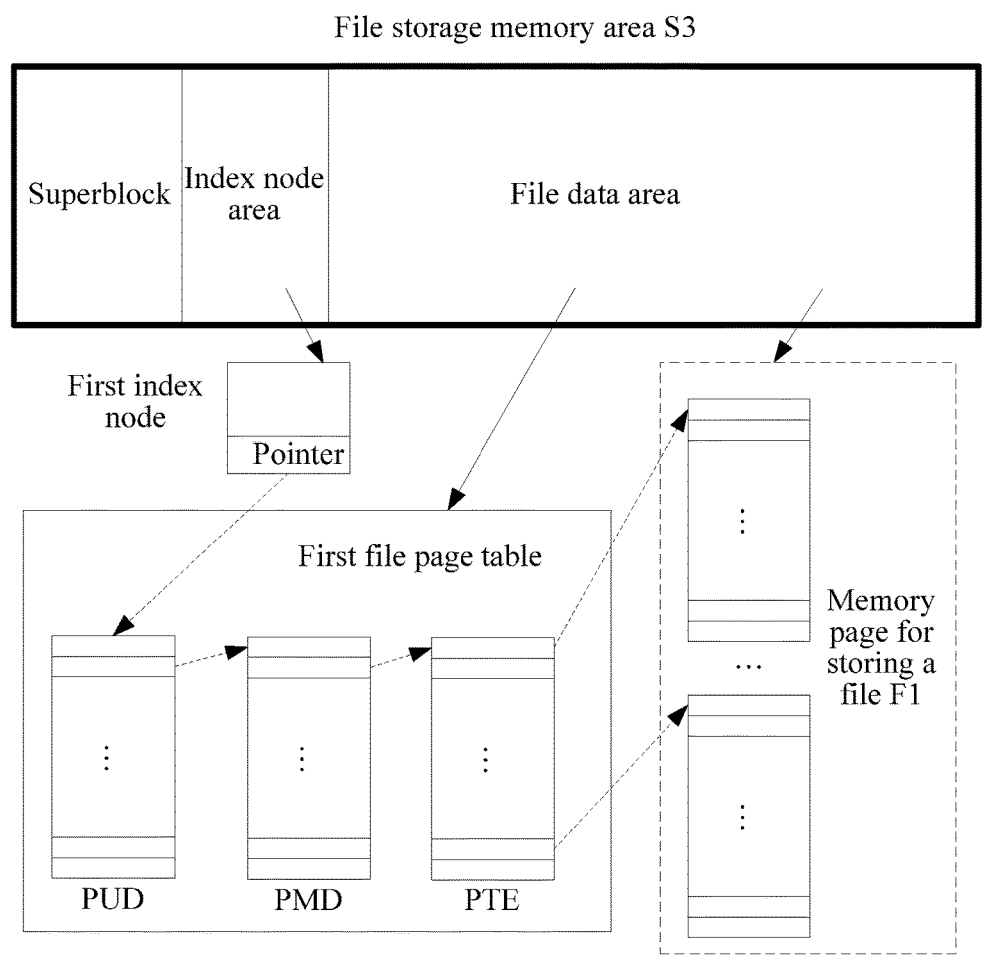
FIG. 6 is a schematic diagram of a relationship between a file page table and a memory page.

A file page table whose data structure is similar to or equivalent to that of a memory page table is used to organize a memory page used for storing a single file, and the file page table may be a one-level or multilevel file page table. A start physical address of a next level of file page table is recorded in each entry of each level of file page table among non-lowest levels of file page table. Moreover, a start physical address of a memory page for storing a file is recorded in each entry of a lowest level of file page table. FIG. 6 exemplifies that a first file page table is a file page table of three levels, which are a PUD level, a PMD level and a PTE level, where a start physical address of a PMD is recorded in each entry in a PUD, a start physical address of a PTE is recorded in each entry of each PMD, and a start physical address of a memory page (where the memory page stores file content of the file F1) is recorded in each entry of a PTE. It can be understood that, a three-level file page table does not need to be used for each file, and even if a three-level page table is used, the three-level page table unnecessarily has a fixed format, for example, 1024 PTEs are not necessarily for each file, and an organization architecture of a file page table may be dynamically adjusted according to a size change of a file. For example, a pointer pointing to a first-level file page table PUD of the three-level file page table (such as a start physical address of the PUD) may be recorded in the first index node.

Each file corresponds to an index node (inode), for example, the first index node includes a pointer used for pointing to a file page table, and a start physical address of a physical memory page to which a highest-level file page table (PUD) of the file F1 belongs is specifically stored in the pointer.

The first index node of the file F1 may further include metadata of the file F1, and the metadata of the file F1 includes attribute information of the file F1 (such as a file size, a file type, a file modification time, and a file creation time).

It can be understood that, a file page table of each file is stored in a file data area of the file storage area. Because of a byte addressable characteristic of the file storage area and a linked-list based organization form of the file page table, the file page table does not need to be placed in a fixed area, and only needs to be used as a general file and stored in the file data area.

Figure 7:
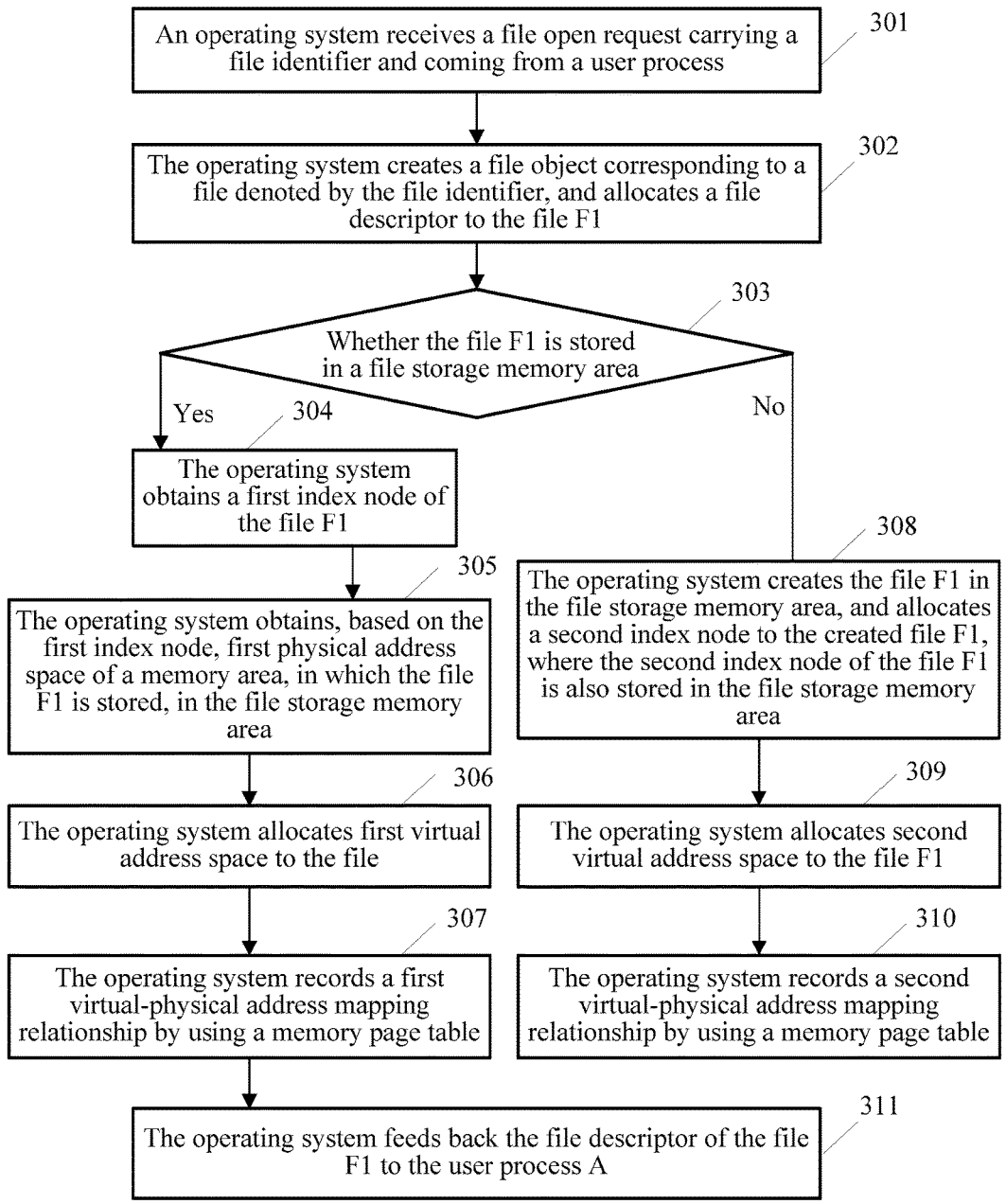
FIG. 7 is a flowchart of another application scenario of the file access method.

FIG. 7 is a flowchart of another application scenario of the file access method.

301: An operating system receives a file open request carrying a file identifier and coming from a user process (referred to as a user process A below).

The file open request may carry a file storage path of a file requested to be opened. The file identifier may be included in the file storage path, and certainly, the file open request may also carry the file identifier and may not carry any file storage path. Further, the file open request may carry a file type flag bit, where the file type flag bit may indicate a file type of a file identified by the file identifier (the file type may be a directory file or data file).

302: The operating system creates a file object corresponding to a file identified by the file identifier (the file is referred to as a file F1 below), and allocates a file descriptor to the file F1, where the file object of the file F1 may be found based on the file descriptor of the file F1.

303: The operating system determines whether the file F1 is stored in a file storage area.

If the file F1 is stored in a file storage area, perform step 304.

If the file F1 is not stored in a file storage area, skip to step 308.

304: The operating system obtains a first index node of the file F1, where the file is stored in the file storage area, and the first index node of the file F1 is also stored in the file storage area.

305: The operating system obtains, based on the first index node, first physical address space of a memory area, in which the file F1 is stored, in the file storage area.

The first index node includes the pointer used for pointing to the first file page table of the file F1, and therefore the pointer used for pointing to the first file page table of the file F1 may be obtained based on the first index node. Because the pointer used for pointing to the first file page table of the file F1 is obtained, the first file page table of the file F1 may be obtained, and then the first physical address space of the memory area, in which the file F1 is stored, in the file storage area may be obtained based on the first file page table of the file F1.

306: The operating system allocates first virtual address space to the file.

First virtual address space of a preset size may be allocated to the file (for example, the size of the first virtual address space may be less than or equal to maximum virtual address space of the system divided by a maximum quantity of files whose simultaneous opening is supported by the system). Alternatively, first virtual address space of a size corresponding to a file type of the file may be also allocated to the file according to the file type.

307: The operating system records a first virtual-physical address mapping relationship by using a memory page table. Skip to step 311.

The first virtual-physical address mapping relationship is a mapping relationship between the first virtual address space and the first physical address space, where the memory page table includes a kernel memory page table and/or a user process memory page table.

The recording a first virtual-physical address mapping relationship by using a memory page table may include: adding, to the memory page table, an entry (may be one or more entries) used for recording the first virtual-physical address mapping relationship, where the entry includes a pointer used for pointing to the first file page table (the pointer used for pointing to the first file page table may include a start physical address of the first file page table).

At least one of the first virtual address space, a start address of the first virtual address space and an end address of the first virtual address space may be further recorded in the first index node, and/or at least one of the first virtual address space, the start address of the first virtual address space and the end address of the first virtual address space may be further recorded in a file object corresponding to the file.

The first virtual address space is continuous or discontinuous virtual address space. The first virtual address space may be located in a kernel virtual address space or the first virtual address space is located in a user process virtual address space.

308: The operating system creates the file F1 in the file storage area, and allocates a second index node to the created file F1, where the second index node of the file F1 is also stored in the file storage area.

A pointer pointing to a second file page table may be recorded in the second index node of the file F1, where the second file page table is used for pointing to second physical address space of the memory area, in which the file F1 is stored, in the file storage area, and the second file page table is a single-level or multilevel file page table.

A file page table whose data structure is similar to or equivalent to that of a memory page table is used to organize a memory page used for storing a single file, and the second file page table may be a one-level or multilevel file page table. A start physical address of a next level of file page table is recorded in each entry of each level of file page table among non-lowest levels of file page table. Moreover, a start physical address of a memory page for storing a file is recorded in each entry of a lowest level of file page table.

Each file corresponds to an index node (inode), for example, the second index node includes a pointer used for pointing to a file page table, and a start physical address of a physical memory page to which a highest-level file page table of the file F1 belongs is specifically stored in the pointer.

The second index node of the file F1 may further include metadata of the file F1, and the metadata of the file F1 includes attribute information of the file F1 (such as a file size, a file type, a file modification time, and a file creation time).

It can be understood that, a file page table of each file is stored in a file data area of the file storage area. Because of a byte addressable characteristic of the file storage area and a linked-list based organization form of the file page table, the second file page table does not need to be placed in a fixed area, and only needs to be used as a general file and stored in the file data area.

309: The operating system allocates second virtual address space to the file F1.

Second virtual address space of a preset size may be allocated to the file (for example, the size of the second virtual address space may be less than or equal to maximum virtual address space of the system divided by a maximum quantity of files whose simultaneous opening is supported by the system). Alternatively, second virtual address space of a size corresponding to a file type of the file may be also allocated to the file according to the file type.

310: The operating system records a second virtual-physical address mapping relationship by using a memory page table. Skip to step 311.

The second virtual-physical address mapping relationship is a mapping relationship between the second virtual address space and the second physical address space, where the memory page table includes a kernel memory page table and/or a user process memory page table.

The recording a second virtual-physical address mapping relationship by using a memory page table may include: adding, to the memory page table, an entry (may be one or more entries) used for recording the second virtual-physical address mapping relationship, where the entry includes a pointer used for pointing to the second file page table. For example, a total quantity of levels of the memory page table is Y, a total quantity of levels of the second file page table is X, and if the entry includes the second file page table, the entry may be an entry in a $(Y-X+1)^{th}$ level of memory page table in the memory page table; or if the entry includes the pointer used for pointing to the second file page table, the entry may be an entry in a $(Y-X)^{th}$ level of memory page table in the memory page table, where X is a positive integer, and Y is a positive integer greater than X. In some special application scenarios, the entry (may be one or more entries) used for recording the second virtual-physical address mapping relationship and added to the memory page table may be also an entry in any level of memory page table in the memory page table.

At least one of the second virtual address space, a start address of the second virtual address space and an end address of the second virtual address space may be further recorded in the second index node, and/or at least one of the second virtual address space, the start address of the second virtual address space and the end address of the second virtual address space may be further recorded in a file object corresponding to the file.

The second virtual address space is continuous or discontinuous virtual address space. The second virtual address space is located in a kernel virtual address space or the second virtual address space is located in a user process virtual address space.

311: The operating system feeds back the file descriptor of the file F1 to the user process A.

The user process A may initiate a read/write operation on the file F1 based on the file descriptor of the file F1.

Figure 8:
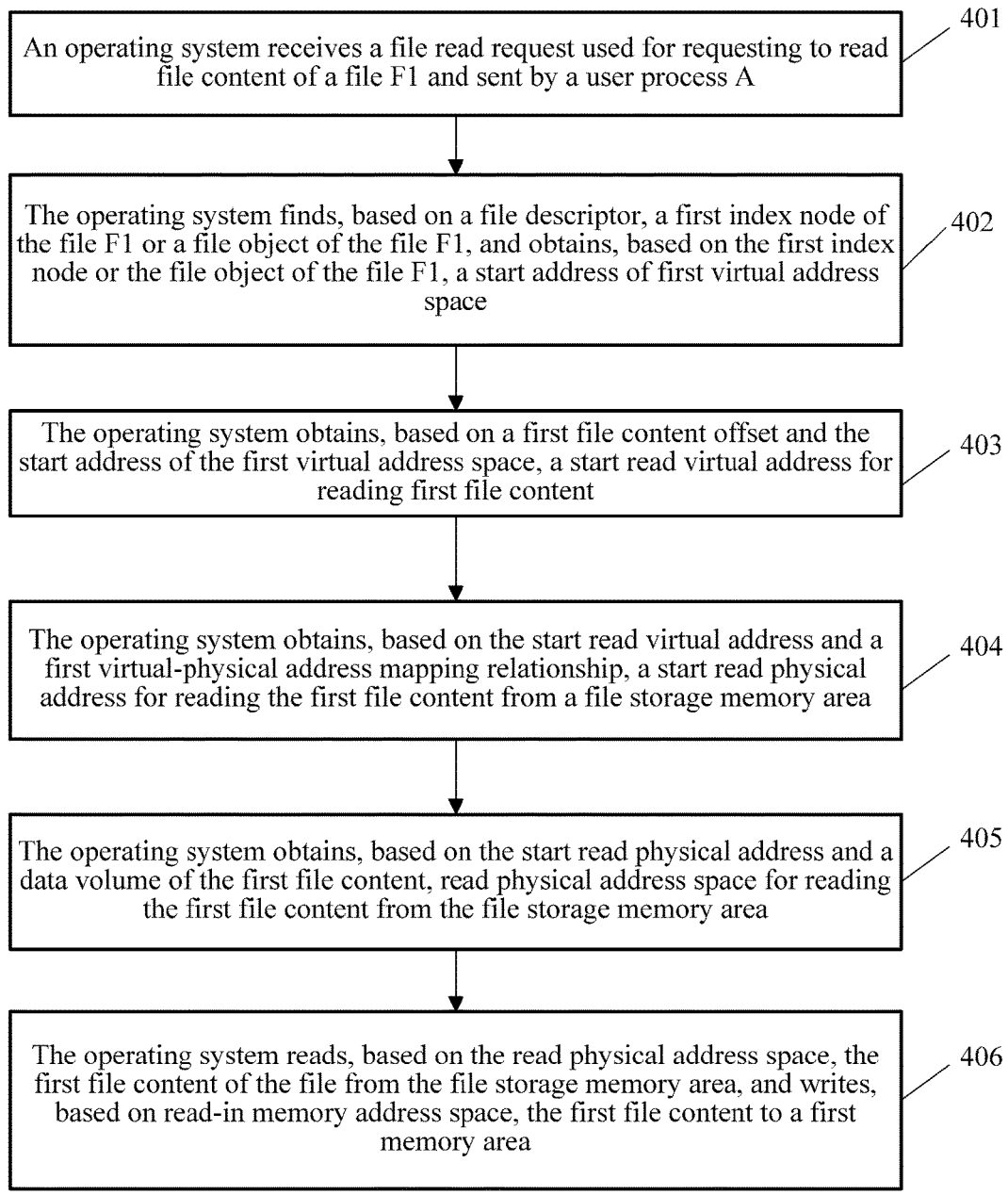
FIG. 8 is a flowchart of another application scenario of the file access method.

FIG. 8 is a flowchart of another file access method according to an embodiment of the present application. The file access method shown in FIG. 8 may be implemented after the technical solution shown in FIG. 2 or FIG. 7 is completely performed. The file access method may include the following:

401: An operating system receives a file read request used for requesting to read file content of a file F1 and sent by a user process A, where the file read request carries read-in memory address space and a data volume of first file content, which is requested to be read, in the file F1.

Moreover, the file read request may further carry a file descriptor of the file.

The read-in memory address space is address space of a first memory area in a user process area.

402: The operating system finds, based on the file descriptor, a first index node of the file F1 or a file object of the file F1, and obtains, based on the first index node or the file object of the file F1, a start address of first virtual address space.

403: The operating system obtains, based on a first file content offset and the start address of the first virtual address space, a start read virtual address for reading the first file content.

404: The operating system obtains, based on the start read virtual address and a first virtual-physical address mapping relationship, a start read physical address for reading the first file content from a file storage area.

405: The operating system obtains, based on the start read physical address and the data volume of the first file content, read physical address space for reading the first file content from the file storage area.

406: The operating system reads, based on the read physical address space, the first file content of the file from the file storage area, and writes, based on the read-in memory address space, the first file content to the first memory area.

It can be seen that, because a first virtual-physical address mapping relationship is recorded by using a kernel memory page table and/or a user process memory page table, it may be considered that to some extent, first physical address space of a memory area, in which a file is stored, in a file storage area is taken as physical address space corresponding to a memory area in a work process area, which helps a kernel or a user process access, when file content is read, the file in the file storage area in a manner similar to that of accessing the work process area. In this way, it helps the kernel or the user process access a file, of a file system, resident in the kernel with data access performance approximate to that of an ordinary memory, which helps greatly improve file access performance. It can be seen that the file access solution is relatively applicable to performing high-performance file access in a scenario in which a file system is resident in a memory.

Figure 9:
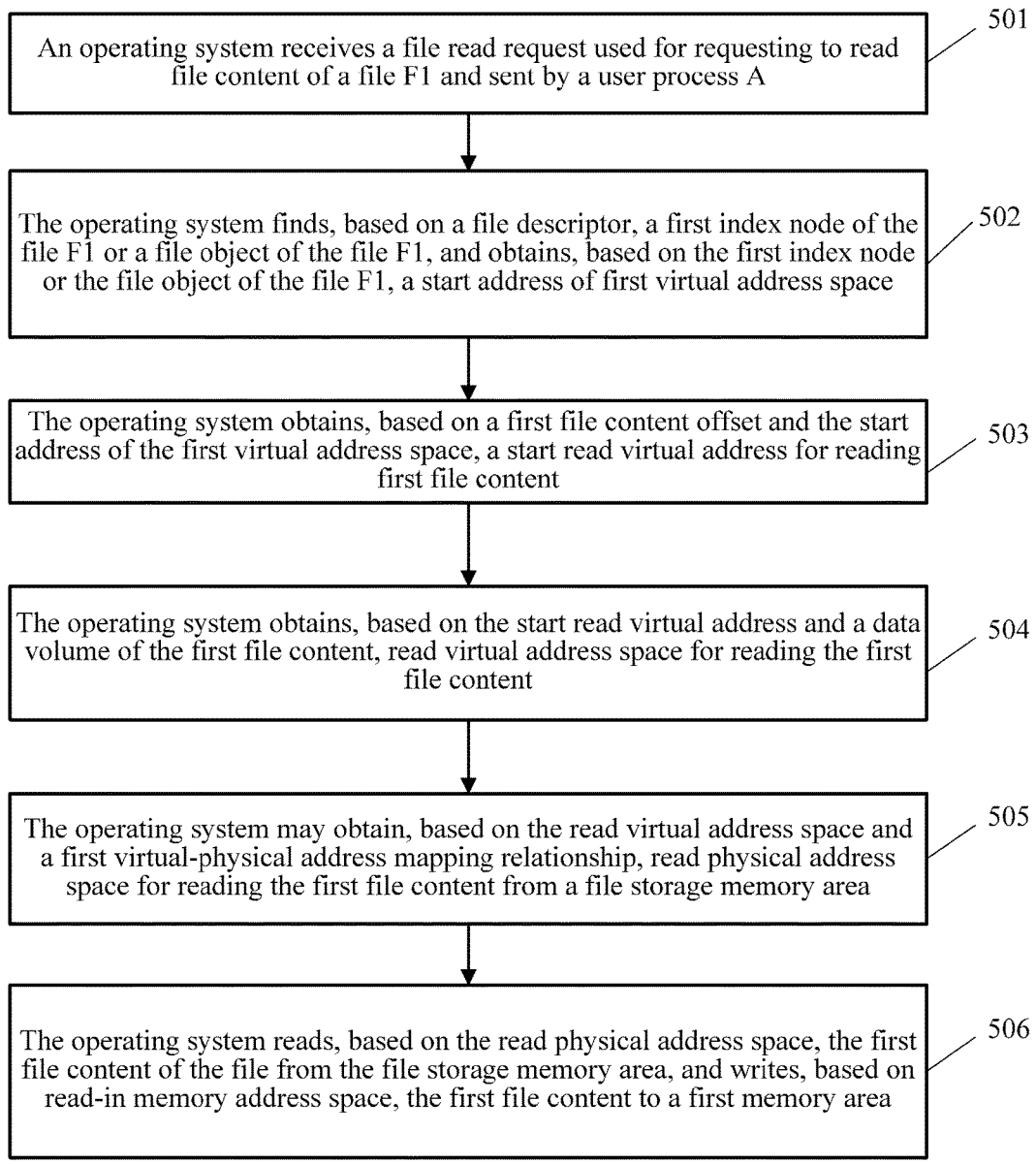
FIG. 9 is a flowchart of another application scenario of the file access method.

FIG. 9 is a flowchart of another file access method according to an embodiment of the present application. The file access method shown in FIG. 9 may be implemented after the technical solution shown in FIG. 2 or FIG. 7 is completely performed. The file access method may include the following:

501: An operating system receives a file read request used for requesting to read first file content of a file F1 and sent by a user process A, where the file read request carries read-in memory address space and a data volume of first file content, which is requested to be read, in the file F1.

Moreover, the file read request may further carry a file descriptor of the file.

The read-in memory address space is address space of a first memory area in a user process area.

502: The operating system finds, based on the file descriptor, a first index node of the file F1 or a file object of the file F1, and obtains, based on the first index node or the file object of the file F1, a start address of first virtual address space.

503: The operating system obtains, based on a first file content offset and the start address of the first virtual address space, a start read virtual address for reading the first file content.

504: The operating system obtains, based on the start read virtual address and the data volume of the first file content, read virtual address space for reading the first file content.

505: The operating system may obtain, based on the read virtual address space and a first virtual-physical address mapping relationship, read physical address space for reading the first file content from the file storage area.

506: The operating system reads, based on the read physical address space, the first file content of the file from the file storage area, and writes, based on the read-in memory address space, the first file content to the first memory area.

It can be seen that, because a first virtual-physical address mapping relationship is recorded by using a kernel memory page table and/or a user process memory page table, it may be considered that to some extent, first physical address space of a memory area, in which a file is stored, in a file storage area is taken as physical address space corresponding to a memory area in a work process area, which helps a kernel or a user process access, when file content is read, the file in the file storage area in a manner similar to that of accessing the work process area. In this way, it helps the kernel or the user process access a file, of a file system, resident in the kernel with data access performance approximate to that of an ordinary memory, which helps greatly improve file access performance. It can be seen that the file access solution is relatively applicable to performing high-performance file access in a scenario in which a file system is resident in a memory.

Figure 10:
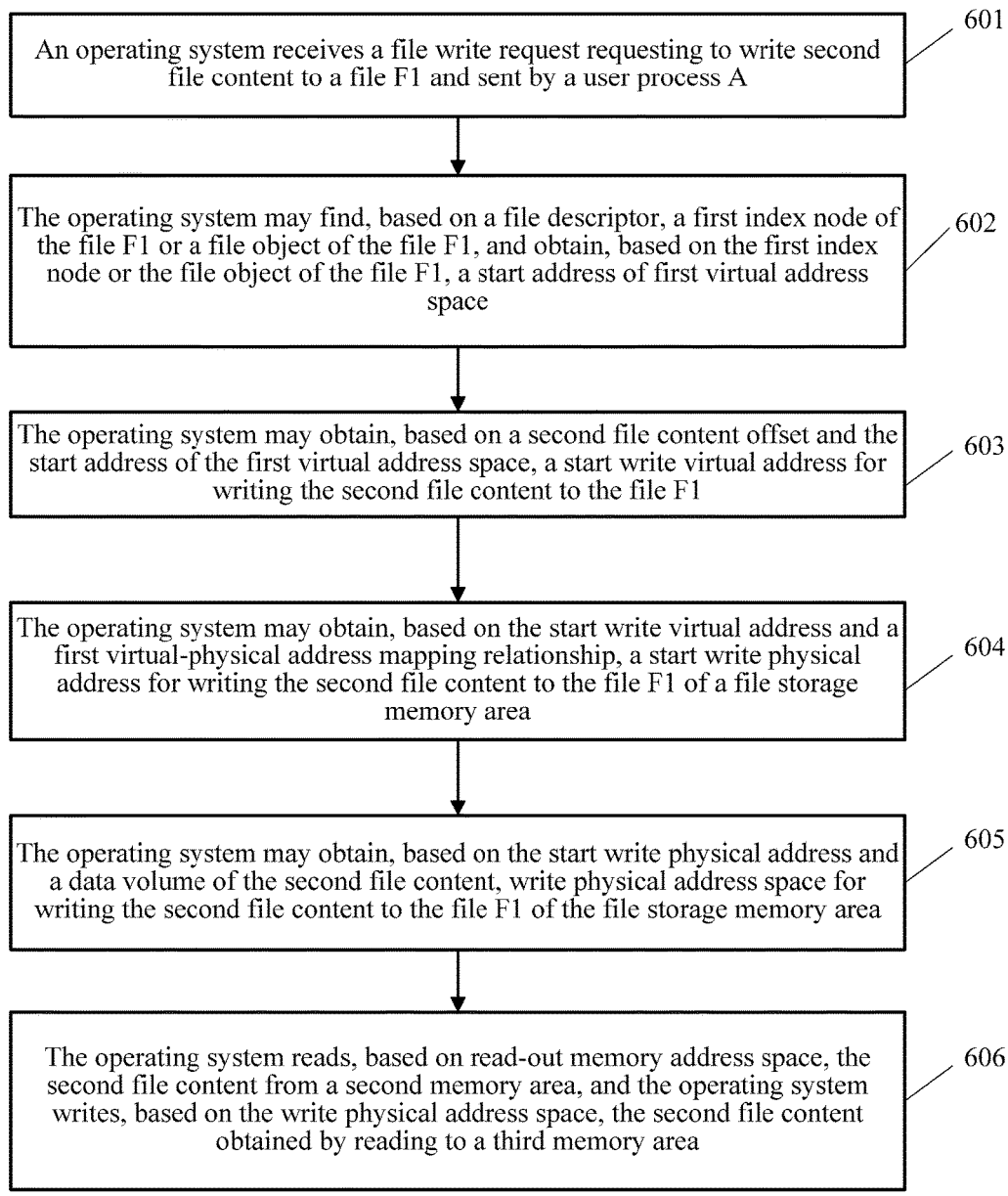
FIG. 10 is a flowchart of another application scenario of the file access method.

FIG. 10 is a flowchart of another file access method according an embodiment of the present application. The file access method shown in FIG. 10 may be implemented after the technical solution shown in FIG. 2 or FIG. 7 is completely performed. The file access method may include the following:

601: An operating system receives a file write request requesting to write second file content to a file F1 and sent by a user process A, where the file write request carries read-out memory address space and a data volume of the second file content that is requested to be written to the file.

Moreover, the file write request may further carry a file descriptor of the file.

The read-out memory address space is address space of a second memory area in a user process area.

602: The operating system may find, based on the file descriptor, a first index node of the file F1 or a file object of the file F1, and the operating system obtains, based on the first index node or the file object of the file F1, a start address of first virtual address space.

603: The operating system may obtain, based on a second file content offset and the start address of the first virtual address space, a start write virtual address for writing the second file content to the file F1.

604: The operating system may obtain, based on the start write virtual address and a first virtual-physical address mapping relationship, a start write physical address for writing the second file content to the file F1 of a file storage area.

605: The operating system may obtain, based on the start write physical address and the data volume of the second file content, write physical address space for writing the second file content to the file F1 of the file storage area.

606: The operating system reads, based on the read-out memory address space, the second file content from the second memory area, and the operating system writes, based on the write physical address space, the second file content obtained by reading to a third memory area.

It can be seen that, because a first virtual-physical address mapping relationship is recorded by using a kernel memory page table and/or a user process memory page table, it may be considered that to some extent, first physical address space of a memory area, in which a file is stored, in a file storage area is taken as physical address space corresponding to a memory area in a work process area, which helps a kernel or a user process access, when file content is written, the file in the file storage area in a manner similar to that of accessing the work process area. In this way, it helps the kernel or the user process access a file, of a file system, resident in the kernel with data access performance approximate to that of an ordinary memory, which helps greatly improve file access performance. It can be seen that the file access solution is relatively applicable to performing high-performance file access in a scenario in which a file system is resident in a memory.

Figure 11:
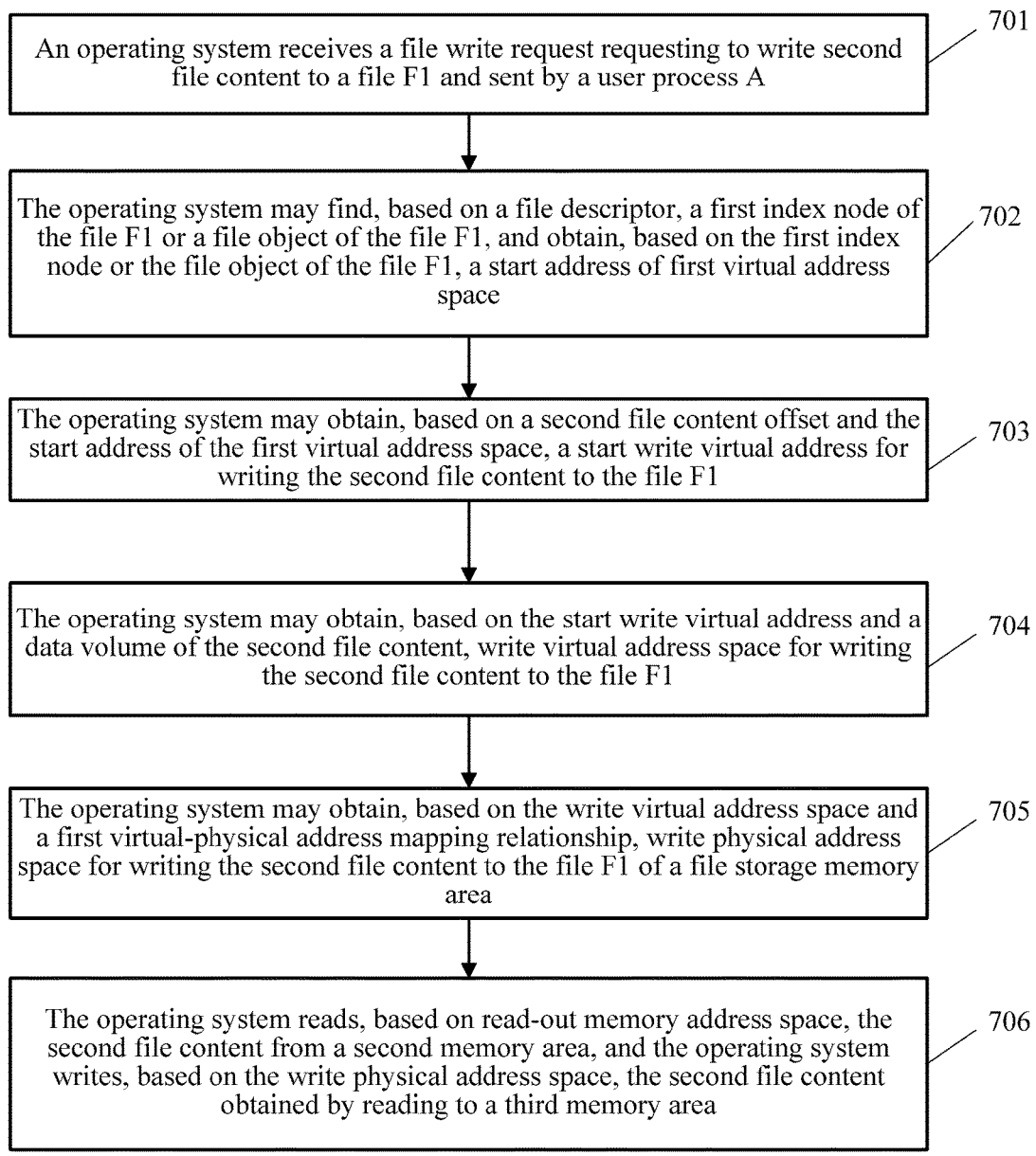
FIG. 11 is a flowchart of another application scenario of the file access method.

FIG. 11 is a flowchart of another file access method according to an embodiment of the present application. The file access method shown in FIG. 11 may be implemented after the technical solution shown in FIG. 2 or FIG. 7 is completely performed. The file access method may include the following:

701: An operating system receives a file write request requesting to write second file content to the file F1 and sent by a user process A, where the file write request carries read-out memory address space and a data volume of the second file content that is requested to be written to the file.

Moreover, the file write request may further carry a file descriptor of the file.

The read-out memory address space is address space of a second memory area in a user process area.

702: The operating system may find, based on the file descriptor, a first index node of the file F1 or a file object of the file F1, and obtain, based on the first index node or the file object of the file F1, a start address of first virtual address space.

703: The operating system may obtain, based on a second file content offset and the start address of the first virtual address space, a start write virtual address for writing the second file content to the file F1.

704: The operating system may obtain, based on the start write virtual address and the data volume of the second file content, write virtual address space for writing the second file content to the file F1.

705: The operating system may obtain, based on the write virtual address space and a first virtual-physical address mapping relationship, write physical address space for writing the second file content to the file F1 of a file storage area.

706: The operating system reads, based on the read-out memory address space, the second file content from the second memory area, and the operating system writes, based on the write physical address space, the second file content obtained by reading to a third memory area.

It can be seen that, because a first virtual-physical address mapping relationship is recorded by using a kernel memory page table and/or a user process memory page table, it may be considered that to some extent, first physical address space of a memory area, in which a file is stored, in a file storage area is taken as physical address space corresponding to a memory area in a work process area, which helps a kernel or a user process access, when file content is written, the file in the file storage area in a manner similar to that of accessing the work process area. In this way, it helps the kernel or the user process access a file, of a file system, resident in the kernel with data access performance approximate to that of an ordinary memory, which helps greatly improve file access performance. It can be seen that the file access solution is relatively applicable to performing high-performance file access in a scenario in which a file system is resident in a memory.

Figure 12:
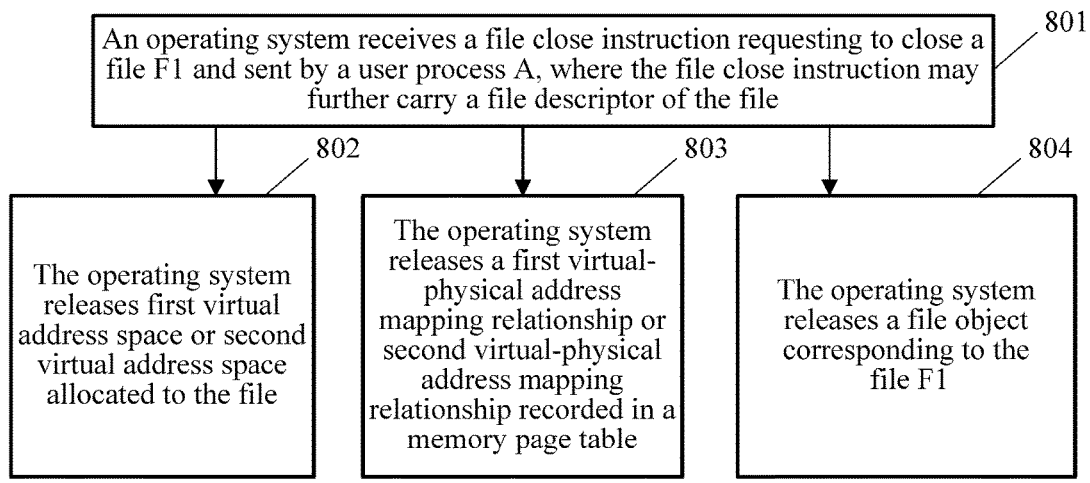
FIG. 12 is a flowchart of another application scenario of the file access method.

FIG. 12 is a flowchart of another file access method according to an embodiment of the present application. The file access method shown in FIG. 12 may be implemented after the technical solution shown in FIG. 2 or any one of FIG. 7 to FIG. 11 is completely performed. The file access method may include the following:

801: An operating system receives a file close request requesting to close a file F1 and sent by a user process A, where the file close request may further carry a file descriptor of the file.

802: The operating system releases first virtual address space or second virtual address space allocated to the file.

803: The operating system releases a first virtual-physical address mapping relationship or second virtual-physical address mapping relationship recorded in a memory page table.

804: The operating system releases a file object corresponding to the file F1.

It can be seen that, because a first virtual-physical address mapping relationship is recorded by using a kernel memory page table and/or a user process memory page table, it may be considered that to some extent, first physical address space of a memory area, in which a file is stored, in a file storage area is taken as physical address space corresponding to a memory area in a work process area, which helps a kernel or a user process access the file in the file storage area in a manner similar to that of accessing the work process area. In this way, it helps the kernel or the user process access a file, of a file system, resident in the kernel with data access performance approximate to that of an ordinary memory, which helps greatly improve file access performance. It can be seen that the file access solution is relatively applicable to performing high-performance file access in a scenario in which a file system is resident in a memory. Moreover, because virtual address space is allocated to a file only when the file is requested to be opened, and the virtual address space allocated to the file is released when the file is closed, it helps reduce a possibility of ineffective occupancy of virtual address space of a system and an address conflict possibility, and helps improve utilization efficiency of the virtual address space of the system.

It can be understood that, any file access method described above may be applied to a computing node, where the computing node may include a memory, and the memory includes: a file storage area and a work process area, where a memory page table is stored in the work process area, and an operating system runs in the work process area. For example, the work process area may include a kernel process area and a user process area, where a kernel memory page table may be stored in the kernel process area, and a user process memory page table may be stored in the user process area, for example, the operating system runs in the kernel process area.

To better implement the foregoing solutions, related apparatuses configured to implement the foregoing solutions are provided below.

Figure 13:
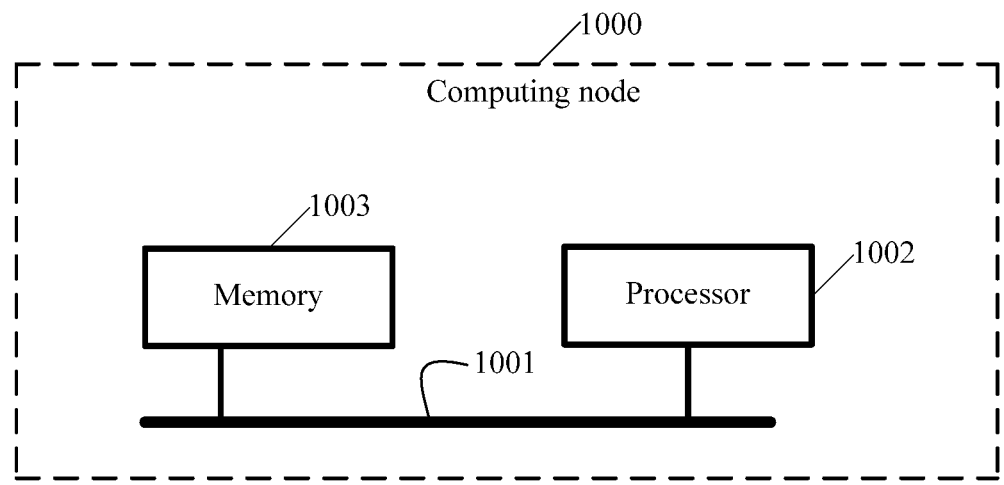
FIG. 13 is a simplified block diagram of a computing node.

FIG. 13 is a simplified block diagram of a computing node 1000. The computing node 1000 includes at least one bus 1001, at least one processor 1002 connected to the bus 1001 and at least one storage device 1003 connected to the bus 1001.

The storage device 1003 may include a memory, and may further include an external storage. The memory may include a file storage area and a work process area, where a memory page table is stored in the work process area, and an operating system runs in the work process area. For example, the work process area may include a kernel process area and a user process area, where a kernel memory page table may be stored in the kernel process area, and a user process memory page table may be stored in the user process area.

The processor 1002 invokes, by using the bus 1001, code stored in the storage device 1003, so that the processor is configured to: receive a file open request carrying a file identifier; obtain a first index node of a file identified by the file identifier, where the file is stored in a file storage area; obtain, based on the first index node, first physical address space of a memory area, in which the file is stored, in the file storage area; allocate first virtual address space to the file; and record a first virtual-physical address mapping relationship by using a memory page table, where the first virtual-physical address mapping relationship includes a mapping relationship between the first virtual address space and the first physical address space, where the memory page table includes a kernel memory page table and/or a user process memory page table.

The file open request may carry a file storage path (that is, a storage path of a file requested to be opened), where the file identifier may be included in the file storage path, and certainly, the file open request may also carry the file identifier and may not carry any file storage path. Further, the file open request may further carry a file type flag bit, where the file type flag bit may indicate a file type of a file identified by the file identifier (the file type may be a directory file or data file).

In the aspect of obtaining, based on the first index node, first physical address space of a memory area, in which the file is stored, in the file storage area, the processor 1002 invokes, by using the bus 1001, code stored in the storage device 1003, so that the processor may be specifically configured to obtain, based on a first file page table recorded in the first index node or a pointer used for pointing to a first file page table and recorded in the first index node, the first physical address space of the memory area, in which the file is stored, in the file storage area, where the first file page table is used for pointing to the memory area, in which the file is stored, in the file storage area, the first physical address space is physical address space of the memory area, in which the file is stored, in the file storage area, and the first file page table is a single-level or multilevel file page table.

The work process area refers to a physical memory area used for storing content such as a data structure and a variable included in a work environment during process running. The data structure and the variable may include at least one piece of the following information: data such as a heap, a stack, a memory mapping area, a variable of a program corresponding to a process, a character and an array during process running.

For example, the user process area may refer to a physical memory area used for storing content such as a data structure and a variable included in a work environment during user process running. The data structure and the variable that are stored in the user process area may include, for example, at least one piece of the following information: data such as a heap, a stack, a memory mapping area, a variable of a program corresponding to a user process, a character and an array during user process running.

For another example, the kernel process area may refer to a physical memory area used for storing content such as a data structure and a variable included in a work environment during kernel process running. The data structure and the variable that are stored in the kernel process area may include, for example, at least one piece of the following information: data such as a heap, a stack, a memory mapping area, a variable of a program corresponding to a kernel process, a character and an array during kernel process running.

The file storage area may refer to a physical memory area used for storing a file system, and various information of the file system may be stored in the file storage area, for example, an index node and a file of the file system may be stored in the file storage area, and information such as a superblock (if exists) of the file system may be further stored in the file storage area.

The file storage area may include a non-volatile memory area and/or a volatile memory area (that is, a storage medium of the file storage area includes a non-volatile storage medium and/or a volatile storage medium). The work process area (such as the kernel process area or the user process area) may include a non-volatile memory area and/or a volatile memory area (that is, a storage medium of the work process area includes a non-volatile storage medium and/or a volatile storage medium). The work process area (such as the kernel process area or the user process area) and the file storage area do not overlap with each other.

In the aspect of recording a first virtual-physical address mapping relationship by using a memory page table, the processor 1002 invokes, by using the bus 1001, code stored in the storage device 1003, so that the processor may be specifically configured to add, to the memory page table, an entry used for recording the first virtual-physical address mapping relationship, where the entry includes the first file page table or the pointer used for pointing to the first file page table.

For example, a total quantity of levels of the memory page table is Y, a total quantity of levels of the first file page table is X, and if the entry includes the first file page table, the entry is an entry in a $(Y-X+1)^{th}$ level of memory page table in the memory page table; or if the entry includes the pointer used for pointing to the first file page table, the entry is an entry in a $(Y-X)^{th}$ level of memory page table in the memory page table, where X is a positive integer, and Y is a positive integer greater than X.

The processor 1002 invokes, by using the bus 1001, code stored in the storage device 1003, so that the processor may be further configured to record the first virtual address space and/or a start address of the first virtual address space in the first index node, and/or record the first virtual address space and/or a start address of the first virtual address space in a file object corresponding to the file.

The first virtual address space may be continuous or discontinuous virtual address space.

The first virtual address space may be located in kernel virtual address space or user process virtual address space.

In the aspect of obtaining a first index node of a file identified by the file identifier, the processor 1002 invokes, by using the bus 1001, code stored in the storage device 1003, so that the processor may be specifically configured to: when it is determined that the file identified by the file identifier is stored in the file storage area, obtain the first index node of the file identified by the file identifier.

The processor 1002 invokes, by using the bus 1001, code stored in the storage device 1003, so that the processor may be further configured to receive a file read request used for requesting to read file content of the file, where the file read request carries read-in memory address space and a data volume of first file content, which is requested to be read, in the file, where the read-in memory address space is address space of a first memory area in a user process area; obtain, based on the data volume of the first file content, the first virtual address space and the first virtual-physical address mapping relationship that is recorded in the memory page table, read physical address space in which the first file content is read from the file storage area; read, based on the read physical address space, the first file content of the file from the file storage area; and write the first file content to the first memory area.

In the aspect of obtaining, based on the data volume of the first file content, the first virtual address space and the first virtual-physical address mapping relationship that is recorded in the memory page table, read physical address space in which the first file content is read from the file storage area, the processor 1002 invokes, by using the bus 1001, code stored in the storage device 1003, so that the processor may be specifically configured to:

obtain, based on the data volume of the first file content, a first file content offset, the first virtual address space and the first virtual-physical address mapping relationship that is recorded in the memory page table, the read physical address space in which the first file content is read from the file storage area, where the first file content offset is obtained from the file read request, or the first file content offset is obtained from the file object corresponding to the file.

For example, a start read virtual address for reading the first file content may be obtained based on the first file content offset (where if the first file content offset is not obtained from the file read request or from the file object corresponding to the file, a default file content offset may be considered as the first file content offset) and the start address of the first virtual address space; a start read physical address for reading the first file content from the file storage area is obtained by using the start read virtual address and the first virtual-physical address mapping relationship; and read physical address space for reading the first file content from the file storage area is obtained based on the start read physical address and the data volume of the first file content.

For another example, a start read virtual address for reading the first file content may be obtained based on the first file content offset (where if the first file content offset is not obtained from the file read request or from the file object corresponding to the file, a default file content offset may be considered as the first file content offset) and the start address of the first virtual address space; read virtual address space for reading the first file content is obtained based on the start read virtual address and the data volume of the first file content; and read physical address space for reading the first file content from the file storage area is obtained by using the read virtual address space and the first virtual-physical address mapping relationship.

The processor 1002 invokes, by using the bus 1001, code stored in the storage device 1003, so that the processor may be further configured to receive a file write request for requesting to write file content to the file, where the file write request carries read-out memory address space and a data volume of second file content that is requested to be written to the file, where the read-out memory address space is address space of a second memory area in the work process area;

obtain, based on the data volume of the second file content, the first virtual address space and the first virtual-physical address mapping relationship that is recorded in the memory page table, write physical address space in which the second file content is written to the file storage area, where the write physical address space is physical address space of a third memory area in the file storage area; and write the second file content temporarily stored in the second memory area to the third memory area.

In the aspect of obtaining, based on the data volume of the second file content, the first virtual address space and the first virtual-physical address mapping relationship that is recorded in the memory page table, write physical address space in which the second file content is written to the file storage area, the processor 1002 invokes, by using the bus 1001, code stored in the storage device 1003, so that the processor may be specifically configured to:

obtain, based on the data volume of the second file content, a second file content offset, the first virtual address space and the first virtual-physical address mapping relationship that is recorded in the memory page table, the write physical address space in which the second file content is written to the file storage area, where the second file content offset is obtained from the file write request, or the second file content offset is obtained from the file object corresponding to the file.

For example, a start write virtual address for writing the second file content to the file may be obtained based on the second file content offset (where if the second file content offset is not obtained from the file write request or from the file object corresponding to the file, a default file content offset may be considered as the second file content offset) and the start address of the first virtual address space; a start write physical address for writing the second file content to the file of the file storage area is obtained by using the start write virtual address and the first virtual-physical address mapping relationship; and the write physical address space for writing the second file content to the file of the file storage area is obtained based on the start write physical address and the data volume of the second file content.

For another example, a start write virtual address for writing the second file content to the file may be obtained based on the second file content offset (where if the second file content offset is not obtained from the file write request or from the file object corresponding to the file, a default file content offset may be considered as the second file content offset) and the start address of the first virtual address space; write virtual address space for writing the second file content to the file of the file storage area is obtained based on the start write virtual address and the data volume of the second file content; and the write physical address space for writing the second file content to the file of the file storage area is obtained by using the write virtual address space and the first virtual-physical address mapping relationship.

A storage capacity of the third memory area may be greater than or equal to the data volume of the second file content. The third memory area and a memory area corresponding to the first physical address space have an intersection set or have no intersection set. It can be understood that, generally, if the third memory area and the memory area corresponding to the first physical address space have an intersection set, it may indicate that the second file content replaces some or all original file content in the file (if the intersection set between the third memory area and the memory area corresponding to the first physical address space is less than the third memory area, it indicates that a new memory area is allocated to the second file content, that is, the memory area for storing the file changes, and the memory area for storing the file is expanded). If the third memory area and the memory area corresponding to the first physical address space have no intersection set, it may indicate that the second file content is newly added to the file, and the third memory area is a new memory area allocated to the second file content, that is, the memory area for storing the file changes, and the memory area for storing the file is expanded.

Further, if the memory area, in which the file is stored, in the file storage area changes, the processor 1002 may update the first file page table, so that an updated first file page table points to a memory area, for currently storing the file, in the file storage area.

Certainly, further, the processor 1002 may update the first virtual-physical address mapping relationship recorded in the memory page table to a third virtual-physical address mapping relationship, where the third virtual-physical address mapping relationship includes a mapping relationship between the first virtual address space and a third physical address space, where the third physical address space is physical address space of the memory area, for currently storing the file, in the file storage area. If a pointer pointing to the first file page table (such as a start physical address, of the first file page table, recorded in the memory page table) is recorded in the memory page table, if a start physical address of an updated first file page table does not change, the pointer pointing to the first file page table and recorded in the memory page table may be not modified. Moreover, in this case, a virtual-physical address mapping relationship may be re-established by updating the first file page table and without the need of modifying the memory page table, which greatly simplifies a mapping operation.

The processor 1002 invokes, by using the bus 1001, code stored in the storage device 1003, so that the processor may be further configured to receive a file close request used for requesting to close the file; release the first virtual address space allocated to the file; and release the first virtual-physical address mapping relationship recorded in the memory page table.

The processor 1002 invokes, by using the bus 1001, code stored in the storage device 1003, so that the processor may be further configured to create the file in the file storage area when it is determined that the file identified by the file identifier is not stored in the file storage area, and allocate a second index node to the file, where a second file page table or a pointer used for pointing to a second file page table is recorded in the second index node, where the second file page table is used for pointing to the memory area, in which the file is stored, in the file storage area; allocate second virtual address space to the file; and record a second virtual-physical address mapping relationship by using a memory page table, where the second virtual-physical address mapping relationship includes a mapping relationship between the second virtual address space and a second physical address space, where the second physical address space is physical address space of the memory area, in which the file is stored, in the file storage area, and the memory page table includes a kernel memory page table and/or a user process memory page table.

After a file open request carrying a file identifier is received, when it is determined that the file identified by the file identifier is not stored in the file storage area, the file is created in the file storage area, and a third index node is allocated to the file. In this case, the processor 1002 may first create no file page table of the file or an empty file page table of the file (where if an empty file page table of the file is created, the third index node may include the empty file page table or a pointer used for pointing to the empty file page table), and when file content needs to be written to the created file, the processor 1002 may expand a memory area for storing the file (for example, expanded from 10 MB to 1000 MB), and the processor 1002 updates the file page table of the file, so that an updated file page table points to an expanded memory area for storing the file.

There may be a correspondence between a quantity of levels of the second file page table and a file type of the file.

The file storage area may include a non-volatile memory area and/or a volatile memory area.

It can be understood that, functions of functional modules of the computing node 1000 of this embodiment may be specifically implemented according to the method in the method embodiment. For a specific implementation process of the functions, reference may be made to the related description of the method embodiment, and details are not described herein again.

The computing node 1000 may be a device having a memory, such as a server, a personal computer, a network element, or a mobile terminal.

Figure 14:
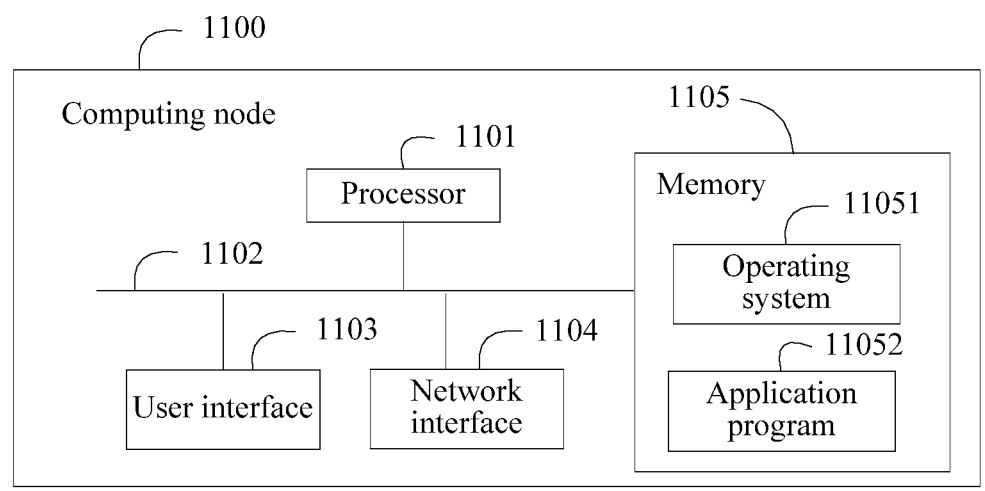
FIG. 14 is another simplified block diagram of a computing node.

FIG. 14 is a more detailed structural block diagram of a computing node 1100, which can be used to implement the file access method according to embodiments of the present application.

The computing node 1100 may include: at least one processor 1101, at least one network interface 1104 or another user interface 1103, a storage device 1105, and at least one communications bus 1102. The communications bus 1102 is configured to implement connection and communication between these components. The computing node 1100 optionally includes the user interface 1103, a display (such as a touch screen, an LCD, a CRT, a holographic device or a projector), a click device (such as a mouse, a trackball touch sensitive panel or a touch screen), a camera and/or a sound pickup apparatus.

The storage device 1105 may include, for example, a read-only memory and a random access memory, and provide an instruction and data to the processor 1101.

A part in the storage device 1105 further includes a non-volatile memory (NVRAM).

For example, the storage device 1105 may include a memory, and may further include an external storage. The memory may include a file storage area and a work process area, where a memory page table is stored in the work process area, and an operating system runs in the work process area. For example, the work process area may include a kernel process area and a user process area, where a kernel memory page table may be stored in the kernel process area, and a user process memory page table may be stored in the user process area.

In some implementation manners, the storage device 1105 stores the following elements, executable modules, or data structures; or a subset of the following elements, executable modules, or data structures; or an extension set of the following elements, executable modules, or data structures:

an operating system 11051, including various system programs, which are used for implementing various basic services and processing a hardware-based task; and an application program module 11052, including various application programs, which are used for implementing various application services.

By invoking a program or an instruction stored in the storage device 1105, the processor 1101 receives a file open request carrying a file identifier; obtains a first index node of a file identified by the file identifier, where the file is stored in a file storage area; obtains, based on the first index node, first physical address space of a memory area, in which the file is stored, in the file storage area; allocates first virtual address space to the file; and records a first virtual-physical address mapping relationship by using a memory page table, where the first virtual-physical address mapping relationship includes a mapping relationship between the first virtual address space and the first physical address space, where the memory page table includes a kernel memory page table and/or a user process memory page table.

The file open request may carry a file storage path (that is, a storage path of a file requested to be opened), where the file identifier may be included in the file storage path, and certainly, the file open request may also carry the file identifier and may not carry any file storage path. Further, the file open request may further carry a file type flag bit, where the file type flag bit may indicate a file type of the file identified by the file identifier (the file type may be a directory file or data file).

In the aspect of obtaining, based on the first index node, first physical address space of a memory area, in which the file is stored, in the file storage area, by invoking a program or an instruction stored in the storage device 1105, the processor 1101 may be specifically configured to obtain, based on a first file page table recorded in the first index node or a pointer used for pointing to a first file page table and recorded in the first index node, the first physical address space of the memory area, in which the file is stored, in the file storage area, where the first file page table is used for pointing to the memory area, in which the file is stored, in the file storage area, the first physical address space is physical address space of the memory area, in which the file is stored, in the file storage area, and the first file page table is a single-level or multilevel file page table.

The work process area refers to a physical memory area used for storing content such as a data structure and a variable included in a work environment during process running. The data structure and the variable may include at least one piece of the following information: data such as a heap, a stack, a memory mapping area, a variable of a program corresponding to a process, a character and an array during process running.

For example, the user process area may refer to a physical memory area used for storing content such as a data structure and a variable included in a work environment during user process running. The data structure and the variable that are stored in the user process area may include, for example, at least one piece of the following information: data such as a heap, a stack, a memory mapping area, a variable of a program corresponding to a user process, a character and an array during user process running.

For another example, the kernel process area may refer to a physical memory area used for storing content such as a data structure and a variable included in a work environment during kernel process running. The data structure and the variable that are stored in the kernel process area may include, for example, at least one piece of the following information: data such as a heap, a stack, a memory mapping area, a variable of a program corresponding to a kernel process, a character and an array during kernel process running.

The file storage area may refer to a physical memory area used for storing a file system, and various information of the file system may be stored in the file storage area, for example, an index node and a file of the file system may be stored in the file storage area, and information such as a superblock (if exists) of the file system may be further stored in the file storage area.

The file storage area may include a non-volatile memory area and/or a volatile memory area (that is, a storage medium of the file storage area includes a non-volatile storage medium and/or a volatile storage medium). The work process area (such as the kernel process area or the user process area) may include a non-volatile memory area and/or a volatile memory area (that is, a storage medium of the work process area includes a non-volatile storage medium and/or a volatile storage medium). The work process area (such as the kernel process area or the user process area) and the file storage area do not overlap with each other.

In the aspect of recording a first virtual-physical address mapping relationship by using a memory page table, by invoking a program or an instruction stored in the storage device 1105, the processor 1101 may be specifically configured to add, to the memory page table, an entry used for recording the first virtual-physical address mapping relationship, where the entry includes the first file page table or the pointer used for pointing to the first file page table.

For example, a total quantity of levels of the memory page table is Y, a total quantity of levels of the first file page table is X, and if the entry includes the first file page table, the entry is an entry in a $(Y-X+1)^{th}$ level of memory page table in the memory page table; or if the entry includes the pointer used for pointing to the first file page table, the entry is an entry in a $(Y-X)^{th}$ level of memory page table in the memory page table, where X is a positive integer, and Y is a positive integer greater than X.

By invoking a program or an instruction stored in the storage device 1105, the processor 1101 may be further configured to record the first virtual address space and/or a start address of the first virtual address space in the first index node, and/or record the first virtual address space and/or a start address of the first virtual address space in a file object corresponding to the file.

The first virtual address space may be continuous or discontinuous virtual address space.

The first virtual address space may be located in kernel virtual address space or user process virtual address space.

In the aspect of obtaining a first index node of a file identified by the file identifier, by invoking a program or an instruction stored in the storage device 1105, the processor 1101 may be specifically configured to: when it is determined that the file identified by the file identifier is stored in the file storage area, obtain the first index node of the file identified by the file identifier.

By invoking a program or an instruction stored in the storage device 1105, the processor 1101 may be further configured to receive a file read request used for requesting to read file content of the file, where the file read request carries read-in memory address space and a data volume of first file content, which is requested to be read, in the file, where the read-in memory address space is address space of a first memory area in a user process area; obtain, based on the data volume of the first file content, the first virtual address space and the first virtual-physical address mapping relationship that is recorded in the memory page table, read physical address space in which the first file content is read from the file storage area; read, based on the read physical address space, the first file content of the file from the file storage area; and write the first file content to the first memory area.

In the aspect of obtaining, based on the data volume of the first file content, the first virtual address space and the first virtual-physical address mapping relationship that is recorded in the memory page table, read physical address space in which the first file content is read from the file storage area, by invoking a program or an instruction stored in the storage device 1105, the processor 1101 may be specifically configured to:

obtain, based on the data volume of the first file content, a first file content offset, the first virtual address space and the first virtual-physical address mapping relationship that is recorded in the memory page table, the read physical address space in which the first file content is read from the file storage area, where the first file content offset is obtained from the file read request, or the first file content offset is obtained from the file object corresponding to the file.

For example, a start read virtual address for reading the first file content may be obtained based on the first file content offset (where if the first file content offset is not obtained from the file read request or from the file object corresponding to the file, a default file content offset may be considered as the first file content offset) and the start address of the first virtual address space; a start read physical address for reading the first file content from the file storage area is obtained by using the start read virtual address and the first virtual-physical address mapping relationship; and read physical address space for reading the first file content from the file storage area is obtained based on the start read physical address and the data volume of the first file content.

For another example, a start read virtual address for reading the first file content may be obtained based on the first file content offset (where if the first file content offset is not obtained from the file read request or from the file object corresponding to the file, a default file content offset may be considered as the first file content offset) and the start address of the first virtual address space; read virtual address space for reading the first file content is obtained based on the start read virtual address and the data volume of the first file content; and read physical address space for reading the first file content from the file storage area is obtained by using the read virtual address space and the first virtual-physical address mapping relationship.

By invoking a program or an instruction stored in the storage device 1105, the processor 1101 may be further configured to receive a file write request for requesting to write file content to the file, where the file write request carries read-out memory address space and a data volume of second file content that is requested to be written to the file, where the read-out memory address space is address space of a second memory area in the work process area;

obtain, based on the data volume of the second file content, the first virtual address space and the first virtual-physical address mapping relationship that is recorded in the memory page table, write physical address space in which the second file content is written to the file storage area, where the write physical address space is physical address space of a third memory area in the file storage area; and write the second file content temporarily stored in the second memory area to the third memory area.

In the aspect of obtaining, based on the data volume of the second file content, the first virtual address space and the first virtual-physical address mapping relationship that is recorded in the memory page table, write physical address space in which the second file content is written to the file storage area, by invoking a program or an instruction stored in the storage device 1105, the processor 1101 may be specifically configured to:

obtain, based on the data volume of the second file content, a second file content offset, the first virtual address space and the first virtual-physical address mapping relationship that is recorded in the memory page table, the write physical address space in which the second file content is written to the file storage area, where the second file content offset is obtained from the file write request, or the second file content offset is obtained from the file object corresponding to the file.

For example, a start write virtual address for writing the second file content to the file may be obtained based on the second file content offset (where if the second file content offset is not obtained from the file write request or from the file object corresponding to the file, a default file content offset may be considered as the second file content offset) and the start address of the first virtual address space; a start write physical address for writing the second file content to the file of the file storage area is obtained by using the start write virtual address and the first virtual-physical address mapping relationship; and the write physical address space for writing the second file content to the file of the file storage area is obtained based on the start write physical address and the data volume of the second file content.

For another example, a start write virtual address for writing the second file content to the file may be obtained based on the second file content offset (where if the second file content offset is not obtained from the file write request or from the file object corresponding to the file, a default file content offset may be considered as the second file content offset) and the start address of the first virtual address space; write virtual address space for writing the second file content to the file of the file storage area is obtained based on the start write virtual address and the data volume of the second file content; and the write physical address space for writing the second file content to the file of the file storage area is obtained by using the write virtual address space and the first virtual-physical address mapping relationship.

A storage capacity of the third memory area may be greater than or equal to the data volume of the second file content. The third memory area and a memory area corresponding to the first physical address space have an intersection set or have no intersection set. It can be understood that, generally, if the third memory area and the memory area corresponding to the first physical address space have an intersection set, it may indicate that the second file content replaces some or all original file content in the file (if the intersection set between the third memory area and the memory area corresponding to the first physical address space is less than the third memory area, it indicates that a new memory area is allocated to the second file content, that is, the memory area for storing the file changes, and the memory area for storing the file is expanded). If the third memory area and the memory area corresponding to the first physical address space have no intersection set, it may indicate that the second file content is newly added to the file, and the third memory area is a new memory area allocated to the second file content, that is, the memory area for storing the file changes, and the memory area for storing the file is expanded.

Further, if the memory area, in which the file is stored, in the file storage area changes, the processor 1101 may update the first file page table, so that an updated first file page table points to a memory area, for currently storing the file, in the file storage area.

Certainly, further, the processor 1101 may update the first virtual-physical address mapping relationship recorded in the memory page table to a third virtual-physical address mapping relationship, where the third virtual-physical address mapping relationship includes a mapping relationship between the first virtual address space and a third physical address space, where the third physical address space is physical address space of the memory area, for currently storing the file, in the file storage area. If a pointer pointing to the first file page table (such as a start physical address, of the first file page table, recorded in the memory page table) is recorded in the memory page table, if a start physical address of the updated first file page table does not change, the pointer pointing to the first file page table and recorded in the memory page table may be not modified. Moreover, in this case, a virtual-physical address mapping relationship may be re-established by updating the first file page table and without the need of modifying the memory page table, which greatly simplifies a mapping operation.

By invoking a program or an instruction stored in the storage device 1105, the processor 1101 may be further configured to receive a file close request used for requesting to close the file; release the first virtual address space allocated to the file; and release the first virtual-physical address mapping relationship recorded in the memory page table.

By invoking a program or an instruction stored in the storage device 1105, the processor 1101 may be further configured to create the file in the file storage area when it is determined that the file identified by the file identifier is not stored in the file storage area, and allocate a second index node to the file, where a second file page table or a pointer used for pointing to a second file page table is recorded in the second index node, where the second file page table is used for pointing to the memory area, in which the file is stored, in the file storage area; allocate second virtual address space to the file; and record a second virtual-physical address mapping relationship by using a memory page table, where the second virtual-physical address mapping relationship includes a mapping relationship between the second virtual address space and a second physical address space, where the second physical address space is physical address space of the memory area, in which the file is stored, in the file storage area, and the memory page table includes a kernel memory page table and/or a user process memory page table.

After a file open request carrying a file identifier is received, when it is determined that a file identified by the file identifier is not stored in the file storage area, the file is created in the file storage area, and a third index node is allocated to the file. In this case, the processor 1101 may first create no file page table of the file or an empty file page table of the file (where if an empty file page table of the file is created, the third index node may include the empty file page table or a pointer used for pointing to the empty file page table), and when file content needs to be written to the created file, the processor 1101 may expand a memory area for storing the file (for example, expanded from 10 MB to 1100 MB), and the processor 1101 updates the file page table of the file, so that an updated file page table points to an expanded memory area for storing the file.

There may be a correspondence between a quantity of levels of the second file page table and a file type of the file.

The file storage area may include a non-volatile memory area and/or a volatile memory area.

The computing node of the embodiments of the present application may be a device having a memory, such as a server, a personal computer, a network element, or a mobile terminal.

The embodiments of the present application further provide a computer storage medium, where the computer storage medium may store a program, and when being executed, the program includes some or all steps of at least one file access method recorded in the method embodiments.

In the foregoing embodiments, the description of each embodiment has respective focuses. For a part that is not described in detail in an embodiment, reference may be made to related descriptions in other embodiments.

It should be noted that, for brief description, the foregoing method embodiments are represented as a series of actions. However, a person skilled in the art should appreciate that the present application is not limited to the described order of the actions, because according to the present application, some steps may be performed in other orders or simultaneously. In addition, a person skilled in the art should also understand that the embodiments described in this specification all belong to exemplary embodiments, and the involved actions and modules are not necessarily mandatory to the present application.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device, and may specifically be a processor in a computer device) to perform all or some of the steps of the foregoing methods described in the embodiments of the present application. The foregoing storage medium may include: any medium that can store program code, such as a USB flash drive, a removable hard disk, a magnetic disk, an optical disc, a read-only memory (ROM), or a random access memory (RAM).

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features of the technical solutions, without departing from the spirit and scope of the technical solutions of the embodiments of the present application.

What is claimed is:

1. A file access method performed by a computing node, wherein the computing node is controlled by an operating system, wherein the computing node comprises a memory, and the memory comprises: a file storage area and a work process area, wherein the operating system runs in the work process area, a file system and files are stored in the file storage area, and the file storage area is non-volatile; the method comprising:
   receiving a file open request that carries a file identifier;
   obtaining a physical address space in the file storage area according to the file identifier, wherein the physical address space is used to store a file identified by the file identifier;
   allocating a virtual address space to the file after receiving the file open request;
   recording a virtual-physical address mapping relationship in a memory page table that is stored in the work process area, wherein the virtual-physical address mapping relationship is a mapping relationship between the virtual address space and the physical address space;
   opening the file in response to the file open request;
   receiving a file access request after the file is opened; and
   accessing, in response to the file access request, the file from the file storage memory area according to the virtual-physical address mapping relationship.

2. The method according to claim 1, wherein obtaining the physical address space of the file comprises:
   obtaining an index node of the file identified by the file identifier;
   obtaining, based on a file page table, the physical address space, wherein the file page table or a pointer pointing to the file page table is recorded in the index node, and the file page table is configured for pointing to the physical address space of the file.

3. The method according to claim 2, wherein recording the virtual-physical address mapping relationship in the memory page table comprises:
   adding an entry in the memory page table for recording the virtual-physical address mapping relationship, wherein the virtual-physical address mapping relationship comprises the virtual address space, and the file page table or the pointer pointing to the file page table.

4. The method according to claim 2, further comprising: recording the virtual address space or a start address of the virtual address space in the index node.

5. The method according to claim 1, further comprising: recording the virtual address space or a start address of the virtual address space in a file object corresponding to the file.

6. The method according to claim 1, wherein the virtual address space is a kernel virtual address space or a user process virtual address space.

7. The method according to claim 1, wherein the file access request is a file read request, and the step of receiving a file access request comprises:
receiving the file read request for reading a file content of the file, wherein the file read request carries a read-in memory address space and a data volume of the file content, wherein the read-in memory address space is an address space of a memory area in the work process area of the memory; and
wherein the step of accessing, in response to the file access request, the file from the file storage memory area according to the virtual-physical address mapping relationship comprises:
obtaining, according to the data volume of the file content, the virtual address space of the file and the virtual-physical address mapping relationship recorded in the memory page table, a read physical address space of the file content in the file storage area;
reading, according to the read physical address space, the file content from the file storage area; and
writing the file content to the memory area in the work process area.

8. The method according to claim 1, wherein the file access request is a file write request, and the step of receiving a file access request comprises:
receiving a file write request for writing a file content to the file, wherein the file write request carries a read-out memory address space and a data volume of the file content, wherein the read-out memory address space is an address space of a memory area in the work process area of the memory; and
wherein the step of accessing, in response to the file access request, the file from the file storage memory area according to the virtual-physical address mapping relationship comprises:
obtaining, according to the data volume of the file content, the virtual address space of the file and the virtual-physical address mapping relationship recorded in the memory page table, a write physical address space of the file content in the file storage area, wherein the write physical address space is a physical address space of a memory area in the file storage area of the memory; and
writing the file content stored in the memory area in the work process area to the memory area in the file storage area.

9. The method according to claim 8, wherein a storage capacity of the memory area in the file storage area is greater than or equal to the data volume of the file content.

10. The method according to claim 1, further comprising:
receiving a file close request for closing the file;
releasing the virtual address space allocated to the file; and
releasing the virtual-physical address mapping relationship recorded in the memory page table.

11. The method according to claim 1, further comprising:
creating the file in the file storage area when it is determined that the file identified by the file identifier is not stored in the file storage area; and
creating an index node of the file.

12. A computing node, comprising:
a processor and a storage device, wherein the storage device comprises a file storage area and a work process memory area, wherein an operating system runs in the work process memory area, a file system and files are stored in the file storage area and the file storage area are non-volatile; and, by executing the operating system, the processor is configured to:
receive a file open request that carries a file identifier;
obtain a physical address space in the file storage area according to the file identifier, wherein the physical address space is used to store a file identified by the file identifier;
allocate a virtual address space to the file after receiving the file open request;
record a virtual-physical address mapping relationship in a memory page table that is stored in the work process area, wherein the virtual-physical address mapping relationship is a mapping relationship between the virtual address space and the physical address space;
open the file in response to the file open request;
receive a file access request after the file is opened; and
access, in response to the file access request, the file from the file storage memory area according to the first virtual-physical address mapping relationship.

13. The computing node according to claim 12, wherein the processor is configured to:
obtain an index node of the file identified by the file identifier; and
obtain, based on a file page table, the physical address space, wherein the file page table or a pointer pointing to the file page table is recorded in the index node, and the file page table is configured for pointing to the physical address space of the file.

14. The computing node according to claim 13, wherein the processor is configured to add an entry in the memory page table for recording the virtual-physical address mapping relationship, wherein the virtual-physical address mapping relationship comprises the virtual address space and the file page table or the pointer pointing to the file page table.

15. The computing node according to claim 12, wherein the processor is further configured to record the virtual address space or a start address of the virtual address space in the index node.

16. The computing node according to claim 12, wherein the processor is further configured to record the virtual address space or a start address of the virtual address space in a file object corresponding to the file.

17. The computing node according to claim 12, wherein the virtual address space is a kernel virtual address space or a user process virtual address space.

18. The computing node according to claim 12, wherein the file access request is a file read request, and the processor is further configured to:
receive the file read request used for reading a file content of the file, wherein the file read request carries a read-in memory address space and a data volume of the file content, wherein the read-in memory address space is an address space of a memory area in the work process area of the storage device;

obtain, according to the data volume of the file content, the virtual address space of the file and the virtual-physical address mapping relationship recorded in the memory page table, a read physical address space of the file content in the file storage area;

read, according to the read physical address space, the first file content from the file storage area; and write the file content to the memory area in the work process area.

19. The computing node according to claim 12, wherein the file access request is a file write request, and the processor is further configured to:

receive the file write request for writing a file content to the file, wherein the file write request carries a read-out memory address space and a data volume of the file content, wherein the read-out memory address space is an address space of a memory area in the work process area of the storage device;

obtain, according to the data volume of the file content, the virtual address space of the file and the virtual-physical address mapping relationship recorded in the memory page table, a write physical address space of the file content in the file storage area, wherein the write physical address space is a physical address space of a memory area in the file storage area of the storage device; and write the file content stored in the memory area in the work process area to the memory area in the file storage area.

20. The computing node according to claim 12, wherein the processor is further configured to:

receive a file close request for closing the file;

release the virtual address space allocated to the file; and release the virtual-physical address mapping relationship recorded in the memory page table.

21. The computing node according to claim 13, wherein the processor is further configured to:

create the file in the file storage area when it is determined that the file identified by the file identifier is not stored in the file storage area, and creating the index node of the file.

22. A storage device of a computing node, comprising a non-transitory storage medium comprising a file storage area and a work process area, wherein a memory page table is stored in the work process area, and an operating system runs in the work process area, a file system and files are stored in the file storage area and the file storage area is non-volatile, wherein the operating system, when being executed by a processor of the computing node, cause the processor to:

receive a file open request that carries a file identifier;

obtain a physical address space in the file storage area according to the file identifier, wherein the physical address space is used to store a file identified by the file identifier;

allocate a virtual address space to the file after receiving the file open request;

record a virtual-physical address mapping relationship in a memory page table that is stored in the work process area, wherein the virtual-physical address mapping relationship is a mapping relationship between the virtual address space and the physical address space;

open the file in response to the file open request;

receive a file access request after the file is opened; and access, in response to the file access request, the file from the file storage memory area according to the first virtual-physical address mapping relationship.

\* \* \* \* \*